United States Patent [19]

Okita et al.

[11] Patent Number: 5,672,014
[45] Date of Patent: Sep. 30, 1997

[54] ROLLING BEARINGS

[75] Inventors: Shigeru Okita; Nobuaki Mitamura; Susumu Tanaka; Kenji Yamamura; Manabu Ohori, all of Kanagawa, Japan

[73] Assignee: NSK Ltd., Tokyo, Japan

[21] Appl. No.: 536,773

[22] Filed: Sep. 29, 1995

[30] Foreign Application Priority Data

Sep. 29, 1994 [JP] Japan .................. 6-235493
Dec. 27, 1994 [JP] Japan .................. 6-326379
Mar. 13, 1995 [JP] Japan .................. 7-052338
Sep. 20, 1995 [JP] Japan .................. 7-242181

[51] Int. Cl.$^6$ ........................................ F16C 33/44
[52] U.S. Cl. .................. 384/492; 384/912; 384/913; 428/457; 428/469; 428/698
[58] Field of Search .................. 428/698, 457, 428/469; 384/492, 912, 913

[56] References Cited

U.S. PATENT DOCUMENTS 5,084,116  1/1992  Mitamura ................ 384/625
5,427,457  6/1995  Furumura et al. ......... 384/912

*Primary Examiner*—Archene Turner
*Attorney, Agent, or Firm*—Sughrue, Mion, Zinn, Macpeak and Seas

[57] ABSTRACT

A rolling bearing has components of an inner race, an outer race and rolling elements, one of the components being formed of an alloy steel containing 0.1–1.0 wt % of C, 0.1–1.5 wt % of Si, 0.1–1.5 wt % of Mn and 0.1–3.0 wt % of Cr, the alloy steel being carbonitrided and then ground to form a surface layer having a carbon and a nitrogen concentration of 0.6–1.5 wt % and 0.05–0.9 wt %, respectively. The surface layer has an appropriate amount of retained austenite $\gamma_R$ and is sufficiently hard to insure long life even under lubrication in the presence of foreign matter. By optimizing the choice of constituent materials, processing methods and heat treatments for each of the rolling elements and the inner and outer races, rolling bearings that have high performance can be produced at low cost.

6 Claims, 3 Drawing Sheets

1

ROLLING BEARINGS

BACKGROUND OF THE INVENTION

The present invention relates to rolling bearings for use in vehicles, agricultural machines, construction machines and the like. In particular, the present invention relates to long-life rolling bearings required for use in drive systems such as transmissions, engines and the like.

Rolling elements in rolling bearings (including both balls and rollers in various rolling bearings), as well as their inner and outer races (including an inner race and an outer race in various rolling bearings) are generally formed of steels corresponding to bearing steels of SUJ 2 or case hardening steels of SCr 420. While in use, rolling bearings are subjected to repeated shearing stresses under high contact pressure. Hence, in order to guarantee the intended rolling fatigue life to withstand the applied shearing stresses, the bearing steels are hardened and tempered (after carburizing or carbonitriding in the case of the case hardening steels) until hardness values of $H_RC$ 58–64 are attained.

However, one should not overlook the fact that rolling bearings are used in many various environments and that in addition to fatigue life, the life of the bearings is often largely affected by factors such as wear and premature flaking, for example, due to insufficiencies in the lubricating conditions, entering of foreign matter from peripheral equipments or the like. It should also be added that in the case of conical roller bearings which are subjected to great axial loads, the wear due to the sliding of transfer surfaces and the wear due to the pure sliding at the larger collar portions may occasionally cause defects. Even in other types of rolling bearings such as thrust bearings and self-aligning roller bearings, the wear due to sliding can sometimes be a problem under severe operating conditions. Under these circumstances, it is desired to develop a highly wear-resistant and inexpensive rolling bearing that not only insures its fatigue life but also guarantees a long life even under lubrication in the presence of foreign matter, so that wear and premature flaking are prevented. Descried below are the advantages and disadvantages of the aforementioned bearing steel SUJ 2 and case-hardening steel SCr 420, both of which are commonly employed in rolling bearings.

SUJ 2 contains large amounts of C and Cr in its alloy composition and tends to generate macro carbides or cause segregation during steelmaking. To eliminate these problems, soaking and other treatments are conducted but then the materials cost becomes higher than that of SCr 420.

Regarding forming process, the rolling elements in small-sized bearings are in almost all cases made from cold-drawn wires (coils), which are formed into shapes of rolling elements by cold die forging (header working) but not subjected to turning process. SUJ 2 has high contents of C and Cr in the alloy composition whereas SCr 420 has low C content; hence, SCr 420 has better cold workability than SUJ 2. Inner and outer races are, on the other hand, formed by hot (warm) forging and hence are not highly dependent on raw materials for workability. The forged races are subjected to softening in preparation for subsequent machining (cutting), however, SUJ 2 is inferior in machinability due to its higher carbon content than SCr 420, so that SUJ 2 tends to raise production costs.

Regarding heat treatments, SUJ 2 generally used needs only to be hardened and tempered for obtaining the hardness required by bearings. On the other hand, SCr 420, in order to obtain the hardness necessary for the surface layer, is first subjected to carburizing or carbonitriding and hardening, followed by tempering. In certain cases, the carburizing or carbonitriding and hardening is followed by secondary hardening before tempering. Hence, SCr 420 requires substantially higher costs of heat treatments than SUJ 2. The term "the surface layer" as used herein refers a range from the surface to the depth at which a maximum shearing stress occurs upon rolling contacts (specifically, the depth is 2% of the diameter of rolling elements). The depth of the surface layer can be reduced within the above range under such conditions that light load is applied to the bearing in the presence of much foreign matter.

As for grindability, the two steel species have no substantial differences although SCr 420 is less grindable than SUJ 2 depending on the amounts of proeutectoid cementite and retained austenite (hereinafter designated with $\gamma_R$) contained in the unground surface layer after being subjected to heat treatment (namely, the surface layer before grinding). However, the grindability of carbonitrided SCr 420 deteriorates considerably because of the precipitation of carbonitrides in the unground surface layer.

With all factors taken into consideration, SUJ 2 is lower than SCr 420 in overall cost including both the materials and processing costs, Regarding the performance of rolling bearings, those made from SCr 420 by carburizing (or carbonitriding) not only have high $\gamma_R$ content in the surface layer but also experience the occurrence of residual compressive stress and therefore they tend to have a longer rolling life, particularly in an environment contaminated by foreign matter. Dimensional stability which is another important parameter in the bearing's performance is superior with SCr 420 than with SUJ 2.

Case hardening SCr 420 and other steels used to produce conventional rolling bearings have had the following various problems: (1) in order to increase the depth of the carburizing hardened layer, carburization must be performed at high temperature for a prolonged time since the carbon content of the matrix is low but then the efficiency of the heat treatment decreases; (2) if the surface carbon concentration is increased, the high Cr content increases the chance of the formation of proeutectoid carbides which, in turn, shorten the rolling fatigue life; (3) if one attempts to improve hardenability by reducing the Cr content while adding Ni and Mo, the materials cost increases; and (4) in certain applications where high wear resistance is particularly needed, it is known to add large amounts of carbide-forming elements such as Cr, Mo and V so that carbides are precipitated in large amounts on the surface layer of a bearing. But, this approach not only adds to the materials cost but also suffers from an increased processing cost due to the deterioration in forgeability, machinability, grindability and the like, as well as increased costs of heat treatments due to deterioration in carburization property. Accordingly, rolling bearings thus manufactured result in high cost.

On the other hand, if bearings are made from the bearing steel SUJ 2, the production cost is low but the life of the bearings becomes short, particularly under such an environment as foreign matter is entered.

To solve these problems, Unexamined Japanese Patent Publication No. Hei. 2-125841 has proposed a rolling bearing which has a low materials cost and high productivity of heat treatments and which yet has a satisfactorily long life. The bearing has the following characteristics: the generation of proeutectoid carbides harmful to the rolling fatigue life of bearings is suppressed by using a medium-carbon manganese steel containing a high matrix carbon content (0.4 to 0.7 wt % of C) in which the content of Cr which is prone to generate proeutectoid carbides is reduced to less than 0.35 wt % but in which 1.2–1.7 wt % of Mn is added in order to avoid the drop in hardenability which otherwise occurs due to the reduced Cr content. In addition, the amount of $\gamma_R$ in the bearing's surface layer is adjusted to fall within 25 to 45 vol % so as to obtain the necessary depth for the hardened layer, so that the rolling bearing is secured to have a satisfactorily extended life even under lubrication in the presence of foreign matter.

Stated more specifically, FIG. 1 accompanying Unexamined Japanese Patent Publication No. Hei. 2-125841, supra, shows that the life of a bearing under lubrication in the presence of foreign matter can be extended by incorporating 25–45 vol % $\gamma_R$ in the surface layer. It has also been shown that the indicated $\gamma_R$ range can be attained by assuring that the solid solution contents of carbon and nitrogen in at least the surface layer is 0.8 wt % or more.

However, this approach has several problems such as reduced workability due to the addition of Mn and reduced grindability due to carbonitriding. In addition, the rolling elements are inherently different from the inner and outer races in terms of not only the capabilities required but also the working conditions employed. Hence, there still is a room for improvements to be made on the conventional art.

SUMMARY OF THE INVENTION

A first object of the present invention is to solve problems associated with the conventional art by forming 25–45 vol % $\gamma_R$ in the surface so as to provide a rolling bearing that is long-lived (has a long rolling life) even under lubrication in the presence of foreign matter.

The present invention has additional objectives to attain. Rolling elements of a bearing are processed by different methods than inner and outer races. The rolling elements are processed by first cold forging, then grinding steps (including lapping); on the other hand, the inner and outer races are processed by first hot (or warm) forging, then successive cutting and grinding (including superfinishing) steps. Because of these differences in processing methods, the rolling elements have had their own problems to solve that are quite different from the problems with the inner and outer races. With the rolling elements, it is necessary to disappear macro carbonitrides from the raw material SUJ 2 to thereby eliminate soaking, so that it is necessary to improve the cold forgeability (the life of the die). On the other hand, with the inner and outer races, it is necessary to improve the machinability (for a longer tool life) and grindability (for longer dressing intervals). Namely, there has still been a room for improvement to provide a rolling bearing that attains the first object of the present invention (insuring a longer life under lubrication in the presence of foreign matter) and which yet can be produced at the lowest possible cost.

On the other hand, in many cases, rolling bearings are generally formed of the same material throughout the inner race, outer race and rolling elements. However, if special properties such as resistance to wear and foreign matter and required, cost considerations sometimes make it necessary to use an expensive material only in the inner and outer races, the fixed race or rolling elements. An example of this approach is described in Unexamined Japanese Patent Publication No. Sho. 63-303221 and it is a method of producing a long-lived bearing by using a steel containing at least 0.3 wt % of C and at least 3 wt % of Cr in at least one of the inner and outer races or the rolling elements while using a high-carbon Cr bearing steel or a case-hardening steel in the other members. However, this method makes no wear or cost considerations.

Accordingly, considering the fact that the rolling elements require different capabilities than the inner and outer races, it is a second object of the present invention to provide a rolling bearing that is optimized for constituent materials, processing methods and heat treatments with respect to the individual components (between rolling elements and both of inner and outer races) so that it exhibits better performance than the conventional bearings. In addition, according to the second object of the present invention, the rolling bearing can operate for a longer period of time under lubrication in the presence of foreign matter, optionally with a sufficiently high wear resistance to withstand use in applications where the wear due to the sliding between each of the rolling elements and the inner or outer race can be a problem, and can be produced at low cost.

With the recent tendency of automobiles toward higher speed, lighter weight and better fuel economy, as well as due to the installation of maintenance-free steelmaking facilities, bearings have come to be used under very severe conditions. Under these circumstances, an improvement in the rolling life in the presence of foreign matter is not the sole requirement to be met but added problems sometimes occur as exemplified by flaking due to the surface damage caused by the foreign matter entering the lubricant oil and wear due to insufficient lubrication.

With a view to solving these problems, Unexamined Japanese Patent Publication No. Hei. 2-277764 has proposed that a high-chromium steel is carburized or carbonitrided to have fine carbides precipitated in the surface layer of a bearing. In addition, the amount of retained austenite $\gamma_R$ is optimized, so that the life of the bearing extends under lubrication in the presence of foreign matter. However, this conventional technique has not fully considered the wear due to insufficient lubrication.

It is, therefore, a third object of the present invention to provide a rolling bearing at low cost that is not only extended in useful life under lubrication in the presence of foreign matter but also improved in wear resistance.

Rolling bearings are also used in passenger car's transmissions under high-speed, light load conditions. With such rolling bearings, high wear resistance and lower cost are two requirements that particularly need be satisfied and it is necessary to take into consideration the ease of workability (e.g. machinability and grindability) of raw materials which has a substantial effect on the manufacturing cost of bearings.

Therefore, a fourth object of the present invention is to provide a low-cost rolling bearing which has not only high wear resistance and can perform for an extended time under lubrication in the presence of foreign matter but which also has good workability and economical advantages, and is further suitable for use in high-speed and light-load applications.

Thus, the primary objective of the present invention is to provide a rolling bearing that is improved in rolling life under lubrication in the presence of foreign matter. The secondary objective is to provide selectively a rolling bearing that has the added feature of availability at the lowest possible cost or a long-lived rolling bearing that exhibits good wear resistance, in accordance with various kinds of rolling bearings and differences in operating condition, under lubrication in the presence of foreign matter.

The first or primary object of the present invention can be attained by a rolling bearing including components of an inner race, an outer race and a plurality of rolling elements, at least one of the components being formed of an alloy steel containing the following elements: $0.1 \leq C \leq 1.0$ wt %; $0.1 \leq Si \leq 1.5$ wt %; $0.1 \leq Mn \leq 1.5$ wt %; and $0.1 \leq Cr \leq 3.0$ wt %, in which the one of the components includes in its surface layer carbon and nitrogen contents of: $0.6 \leq C \leq 1.5$ wt %; and $0.05 \leq N \leq 0.9$ wt %.

The second object of the present invention can be attained by a rolling bearing including components of an inner race, an outer race and a plurality of rolling elements, the rolling elements being formed of an alloy steel containing the following elements: $0.7 \leq C \leq 0.90$ wt %; $0.1 \leq Si \leq 0.7$ wt %; $0.5 \leq Mn \leq 1.1$ wt %; $0.1 \leq Cr \leq 0.6$ wt %; and incidental impurities and the balance of Fe, in which each of the rolling elements includes in its surface layer carbon and nitrogen contents of: $0.8 \leq C \leq 1.4$ wt %; and $0.05 \leq N \leq 0.3$ wt %, further at least one of the inner race and the outer race being formed of an alloy steel consisting essentially of: $0.3 \leq C \leq 0.6$ wt %; $0.1 \leq Si \leq 0.7$ wt %; $0.6 \leq Mn \leq 1.5$ wt %; $0.1 \leq Cr \leq 0.6$ wt %; incidental impurities and the balance of Fe, in which each of the inner race and the outer race includes in its surface layer carbon and nitrogen contents of: $0.8 \leq C \leq 1.4$ wt %; and $0.05 \leq N \leq 0.3$ wt %.

Further, in the second object of the present invention, the rolling bearing, particularly, which has the superior wear resistance against the sliding between the rolling elements and both races, can be attained by the rolling elements are formed of a first alloy steel containing: $0.7 \leq C \leq 0.9$ wt %; $0.1 \leq Si \leq 0.7$ wt %; $0.5 \leq Mn \leq 1.1$ wt %; $0.1 \leq Cr \leq 0.6$ wt %; and incidental impurities and the balance of Fe, in which each of the rolling elements includes, in its surface layer, C and N contents of $0.8 \leq C \leq 1.4$ wt % and $0.05 \leq N \leq 0.3$ wt %, in which at least one of the inner race and the outer race are formed of a second alloy steel consisting essentially of: $0.1 \leq C \leq 1.0$ wt %; $0.1 \leq Si \leq 1.5$ wt %; $0.1 \leq Mn \leq 1.5$ wt %; Cr being more 0.2–2.0 wt % than a Cr content of the first alloy steel; and incidental impurities and the balance of Fe, in which each of the inner race and the outer race includes a hardened surface layer.

The third object of the present invention can be attained by a rolling bearing in which at least one member selected from the group consisting of rolling elements, an inner race and an outer race is formed of an alloy steel containing: $0.1 \leq C \leq 1.0$ wt %; $0.1 \leq Si \leq 1.5$ wt %; $0.1 \leq Mn \leq 1.5$ wt %; $0.5 \leq Cr \leq 3.0$ wt %; $Mo \leq 3.0$ wt %; $V \leq 2.0$ wt %; $Ni \leq 2.0$ wt %; and incidental impurities and the balance of Fe, in which the alloy steel is carbonitrided to form a surface layer having the following carbon and nitrogen contents: $0.8 \leq C \leq 1.5$ wt %; and $0.3 \leq N \leq 0.7$ wt %.

The rolling bearing that attains the third object of the present invention insures satisfactory wear resistance under lubrication in the presence of foreign matter, particularly in steelmaking applications where low-speed, heavy-load operations are predominant.

In contrast, the rolling bearing that satisfies the fourth object of the present invention is particularly intended for use with automobile's transmissions and other applications where high-speed, light-load conditions are predominant and, hence, satisfies both requirements for high wear resistance and low cost. In this rolling bearing, at least one of components of an inner race, an outer race and rolling elements is formed of an alloy steel containing: $0.3 \leq C \leq 0.9$ wt %; $0.1 \leq Si \leq 0.7$ wt %; $0.5 \leq Mn \leq 1.5$ wt %; $0.1 \leq Cr \leq 0.8$ wt %; and incidental impurities and the balance of Fe, in which the alloy steel is carbonitrided and then ground to form a surface layer having the following carbon and nitrogen contents: $0.6 \leq C \leq 1.2$ wt %; and $0.2 \leq N \leq 0.9$ wt %, and in which the total content of Cr and N (the sum of the Cr content of the raw material and the N content of the surface layer; hereinafter the same) is as follows: $0.4 \leq Cr+N \leq 1.0$ wt %.

DETAILED DESCRIPTION OF THE INVENTION

Figure 1:
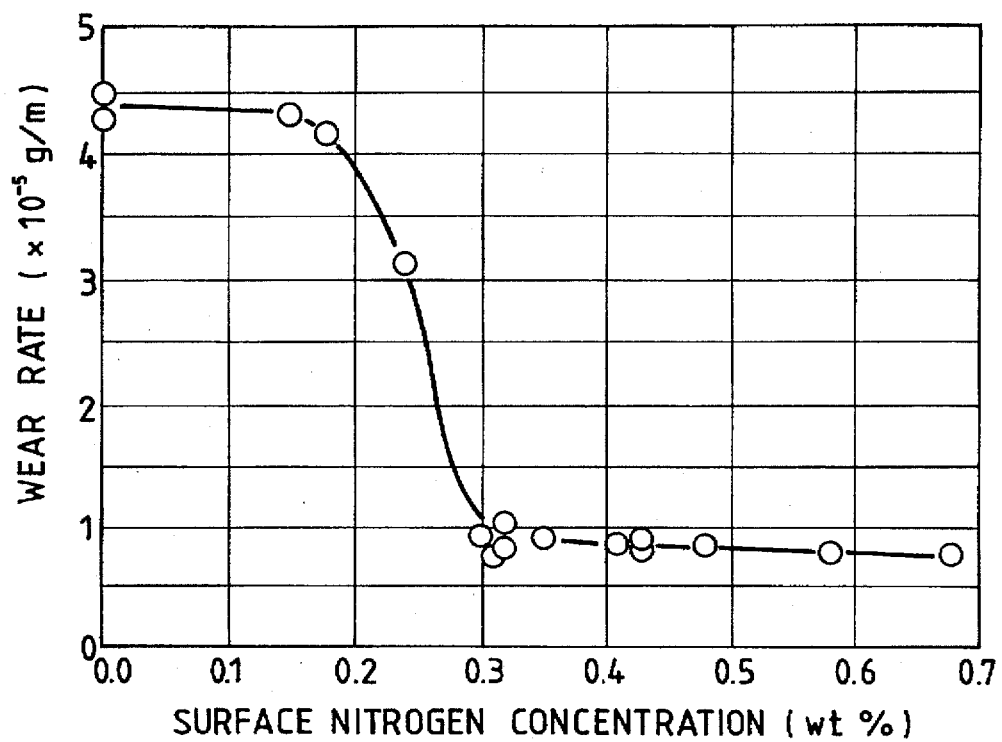
FIG. 1 is a graph showing the wear of a rolling bearing member as a function of the surface nitrogen concentration.

Description will be given below in detail of a rolling bearing according to the present invention with reference to the accompanying drawings.

First, there are explained the reasons for limiting the compositional ranges of the alloy components to be used in the rolling bearing that attains a first object of the present invention.

Carbon content

Carbon is the element necessary for converting the matrix to martensite, thereby insuring that improved hardness is attained after hardening and tempering. The carbon content is set to 0.1 wt % and more in order to insure the necessary strength for bearings. The upper limit of the carbon content is set to 1.0 wt % because inclusion of a greater amount of carbon lowers the toughness of the core of an individual component of the bearing.

Silicon content

Silicon is an element necessary to be used as a deoxidizer in the steelmaking process. It is also an element effective in enhancing the resistance to temper softening, thereby extending the rolling fatigue life of a bearing. Hence, silicon is contained in an amount of at least 0.1 wt %. On the other hand, Si retards the entrance of carbon and nitrogen into the surface during carbonitriding, so that the efficiency of heat treatments is reduced. Hence, the upper limit of the silicon content is set to 1.5 wt %.

Manganese content

Manganese is an element necessary to be used as a deoxidizer and a desulfurizer in the steelmaking process. It is also an element effective in providing improved hardenability. Hence, manganese is contained in an amount of at least 0.1 wt %. However, excessive addition of manganese results in lower machinability. Therefore, the upper limit of the manganese content is set to 1.5 wt %.

Chromium content

Chromium is an element capable of strengthening the matrix such as by improving its hardenability and resistance to temper softening. To insure that chromium exhibits its intended effect, a minimum of 0.1 wt % is necessary. On the other hand, if Cr is added in an excessive amount, Cr oxides form on the surface and retard the entrance of carbon and nitrogen into the surface during carbonitriding, so that the efficiency of heat treatments deteriorates. Hence, the upper limit of the Cr content is set to 3.0 wt %.

Carbon content of the surface of a complete bearing

In the case where the carbonitriding is performed, if the carbon content is at least 0.6 wt % in view of the nitrogen content, rolling bearings can obtain the minimum necessary hardness and wear resistance. Therefore, the lower limit of the carbon content is set to 0.6 wt %. On the other hand, if the carbon concentration of the surface layer exceeds 1.5 wt %, the combination with the conditions to be described below causes reticulate coarse carbides to precipitate at crystal's grain boundaries, where stress concentration occurs to shorten the rolling fatigue life of the bearing.

Nitrogen content of the surface of a complete bearing

If the N content in the surface layer of the complete product is less than 0.05 wt %, the solid solution N is insufficient to achieve adequate contents of surface hardness and $\gamma_R$, thus failing to extend the life of the bearing.

As the nitrogen content increases, nitrides start to precipitate and the wear resistance improves. However, depending on the amount of Cr addition, the improvement in wear resistance may be accompanied by deterioration in grindability and, if the N content exceeds 0.9 wt %, the grindability can no longer be improved by reducing the addition of Cr.

The present inventors conducted intensive studies, in order to provide a rolling bearing that attains a first object of having a long life even under lubrication in the presence of foreign matter and a second object of being manufactured at low cost, on optimal constituent materials and heat treatments in consideration of the costs that would be involved in ensuring different capabilities required between the rolling elements and both of the inner and outer races, as well as efficient processing operations. As a result, the inventors found the following:

(1) The rolling elements in a small-sized rolling bearing, for example, can be rendered to be long-lived at minimum materials processing costs by proper adjustments in the composition of the raw material and by suitable heat treatments; and (2) Aside from the rolling elements, both the inner and outer races can be rendered to have both dimensional stability and long life at minimum materials and processing costs by proper adjustments in the composition of the raw material and by suitable heat treatments.

By combining such inner and outer races with the rolling elements described in (1), it has become possible to provide a high-performance bearing at low cost.

There is described in bellow the criticality of numerical limitations and other elements of the rolling bearing that attains the second object of the present invention.

First, there are explained the reasons for limiting the compositional ranges of the alloy components to be used in the rolling bearing that attains the second object of the present invention.

Carbon content

Rolling elements undergo little deformation upon heat treatments and have grinding allowable portions in only small amounts after heat treatments; therefore, even if they are subjected to a carbonitriding treatment for only a short time, an adequate amount of carbonitrided layer remains on the surface layer of a complete product finished by grinding. In addition, the carbonitriding treatment provides appropriate amounts of $\gamma_R$ and residual compressive stress in the surface of the complete product even if it is made of a low alloy steel and this contributes to the production of a bearing that is long-lived even under lubrication in the presence of foreign matter. However, a short carbonitriding treatment may sometimes cause insufficiency in the effective depth of the hardened layer. Hence, in order to insure that an adequately deep hardened layer is formed even if carbonitriding is effected for only a short time, the lower limit of the carbon content is set to 0.7 wt % as a preferable value in the raw material for the rolling elements.

On the other hand, the cold workability of steels has such a tendency that resistance to deformation increases with the increasing carbon content of the raw material and even if the Cr content is reduced, a carbon content exceeding 0.9 wt % shortens the tool life or the life of the die. In addition, a raw material containing carbon in excess of 0.9 wt % is expensive since soaking for eliminating macro carbides and segregation is necessary in the steelmaking process.

For the reasons stated above, the carbon content of the raw material for the rolling elements is specified to range from 0.7 wt % to 0.9 wt % as a preferable range.

As in the case of the rolling elements, the raw material for the inner and outer races should advantageously have a higher carbon content in order to shorten the time of heat treatments. On the other hand, the inner and outer races which are assembled in the bearing shaft and the housing should experience minimum dimensional changes with time during service; hence, dimensional stability is an important characteristic for the inner and outer races.

If the carbon content of the raw material for the inner and outer races exceeds 0.6 wt %, the amount of $\gamma_R$ in the core of either raceway increases to a more-than-necessary content and this deteriorates its dimensional stability, leading to a defect such as the occurrence of creep in the inner race depending on the use conditions.

If, on the other hand, the carbon content of the raw material is lower than 0.3 wt %, the carbonitriding treatment has to be performed for an extended time and the overall efficiency of heat treatments reduces. In addition, the hardenability is insufficient to produce a satisfactory hardened layer.

For the reasons stated above, the carbon content of the raw material for the inner and outer races is specified to range from 0.3 wt % to 0.6 wt % as a preferable range.

Silicon content

Silicon serves as a deoxidizer in the process of making the raw material steel, thereby improving its hardenability and strengthening the matrix martensite; thus, silicon is an element effective in extending the life of bearing components including not only the rolling elements but also the inner and outer races. To insure that silicon displays its intended effect, it must be present in a minimum amount of 0.1 wt %. On the other hand, excessive Si not only deteriorates machinability, forgeability and cold workability but also causes a significant decrease in the depth of diffusion during carbonitriding. Hence, in order to insure that carbonitriding exhibits the intended effect in the present invention even if it is performed for only a short time, the upper limit for the Si content is specified to be 0.7 wt % as a preferable value.

For the reasons stated above, the silicon content of the raw material for both the rolling elements and the inner and outer races is specified to range from 0.1 wt % to 0.7 wt %. If the depth of a carbonitrided layer is particularly important, the Si content is desirably at least 0.5 wt % or more.

Manganese content

For better hardenability, Mn or Cr is a common additive. However, Cr is a carbide forming element and not all of the Cr added with contribute to improve the hadenability of the matrix and, in addition, Cr is more costly than Mn. In order to hold the materials and processing costs to the lowest content, the alloy components to be used in the present invention are set to fall within the minimum necessary ranges.

Thus, as regards the rolling elements, the Mn content is specified to be preferably 0.5 wt % at minimum in order to insure that hardenability is positively enhanced with a small amount of the element and considering the fact that Mn is also a retained austenite forming element which is effective in extending the rolling life of a bearing under lubrication in the presence of foreign matter. On the other hand, Mn is an element for strengthening the ferrite in the raw material and its cold workability deteriorates considerably if the Mn content increases. Therefore, the upper limit of the Mn content is specified to be preferably 1.1 wt %.

For the reasons stated above, the Mn content in the raw material for the rolling elements is specified to range from 0.5 wt % to 1.1 wt %.

The same explanation is applied to the Mn content of the inner and outer races, except that they are less adversely affected by Mn in terms of workability since they are worked by hot (or warm) forging. On the other hand, the geometry of the inner and outer races makes them less hardenable than the rolling elements. Hence, the inner and outer races are adapted to contain a somewhat greater amount of Mn than the rolling elements and the lower limit of the required Mn content is set to 0.6 wt % as a preferable value. However, if the Mn content exceeds 1.3 wt %, the forgeability and the machinability after normal softening (as held at 670°–690° C.) deteriorate. Therefore, if normal softening is to be done at a holding temperature of 670°–690° C., the upper limit of the Mn content is set to 1.3 wt % as a preferable value.

As already mentioned, the second object of the present invention is to provide inexpensive rolling bearings and in this case it is assumed that rolling elements can be fabricated by die forging up to a diameter (or an average diameter if the rolling elements are conical rollers) of about 22 mm and the inner and outer races to be combined with such rolling elements may have a wall thickness of up to about 15 mm. If the geometrically disadvantageous inner and outer races are to be fabricated in that small size, 1.3 wt % of Mn renders the hardenability somewhat inadequate. However, Mn cannot simply be contained in excess of 1.3 wt % without shortening the life of the tool to be used in a machining (cutting) step.

Under the circumstances, the present inventors conducted intensive studies on the relationship between machinability and the conditions of softening which is performed prior to a machining step. As a result, it has been found that if the softening conditions are set as appropriate to the carbon content of the raw material, the Mn content can be increased up to 1.5 wt % without sacrificing the machinability (tool life). A specific explanation will follow. In the case of a raw material having a carbon content of less than 0.3 wt %, common low-temperature softening is typically performed by annealing at about 680° C. (±ca. 10° C.). However, with the increasing carbon content in the raw material, the pearlitic structure increases and so does the amount of carbides; hence, the normal softening process is incapable of sufficient reduction in hardness and the machinability of the raw material decreases. To overcome this difficulty, annealing is performed at higher temperatures than in the normal case so that the shape of carbide grains becomes as closely as possible to a sphere to thereby insure better machinability.

On the other hand, in the case of a raw material having a carbon content of 0.3 wt % to less than 0.4 wt %, an excessively high annealing temperature causes carbides to solve in the matrix and, depending on the manner in which the raw material is left to cool, it may revert to the initial state, thus failing to soften satisfactorily. The present inventors have found that in order to accomplish effective softening within a short time, a raw material having a carbon content of 0.3 wt % to less than 0.4 wt % need be heated and held at a (maximum) temperature of 700° 720° C.

It has also been found that in the case of a raw material having a carbon content of 0.4 wt % to 0.6 wt %, the holding temperature may be slightly increased to fall within the range from 740° to 760° C.

However, when the Mn content of the raw material exceeded 1.5 wt %, the life of the cutting tool could not be extended by altering the annealing conditions.

For the reasons stated above, the Mn content of the raw material for the inner and outer races is specified to range from 0.6 wt % to 1.5 wt % as a preferable range.

Chromium content

Chromium is an element capable of strengthening the matrix such as by improving its hardenability and resistance to temper softening. To insure that chromium exhibits its intended effect, a minimum of 0.1 wt % is necessary. However, as already mentioned in association with manganese, Cr is also a carbide-forming element and not all of the added Cr content always solve in the matrix and its effect of improving hardenability decreases rather than increase. If the Cr content exceeds 0.6 wt %, soaking must be performed in the steelmaking process in order to prevent the generation of macro carbides and segregation and this increases not only the cost for Cr addition but also the cost of the raw material. In addition, a more-than-necessary amount of nitrogen solves in the surface layer formed by carbonitriding and the grindability of the raw material tends to deteriorate. Hence, the upper limit of the Cr content in the raw material is set to be preferably 0.6 wt % whether it is used to make rolling elements or inner and outer races.

For the reasons stated above, the Cr content of the raw material for the rolling elements, as well as the inner and outer races is specified to range from 0.1 wt % to preferably 0.6 wt %.

Fe and incidental impurity contents

The cleanliness of bearing steels is known to have a significant effect on the rolling life of bearings, particularly under lubrication in a clean condition. Impurity elements in bearing steels, particularly S, Ti and O, reduce their cleanliness, thereby adversely affecting their life; therefore, the contents of these impurities are strictly specified in long-lived materials. However, if the Ti and O additions are reduced to extremely low contents, the materials cost may sometimes be increased; on the other hand, if the S addition is reduced to an extremely low content, the workability of the bearing steel may deteriorate so that the processing cost increases.

The rolling bearings of the present invention are especially intended for use in applications where an extended service life must be ensured under lubrication in the presence of foreign matter; that is, assuring satisfactory contents of hardness and percent $\gamma_R$ by proper selection of constituent materials and heat treatment characteristics is more important than making such a strict control on impurity contents as to potentially increase the materials or processing cost.

For the reasons stated above, neither the Fe nor incidental impurity is specified in content limitation which is to be contained in the raw material for the rolling elements or the inner and outer races. However, every raw material to be used in the present invention shall be of a bearing quality which meets the regulations on cleanliness (JIS G4805), thereby qualifying it for use as a bearing material.

The criticality of parameters (e.g. workability) is described other than the compositional ranges of the alloy components to be used in the rolling bearing which attains the second object of the present invention.

Raw material for rolling elements and its shaping

The rolling elements of small-sized rolling bearings are, in almost all cases, fabricated by header-working coils. The header-worked rolling elements need not be worked by turning, so the product yield per given amount of the raw material and, hence, the production efficiency, is high enough to realize low cost but only the life of the die affects the cost. The life of the die is influenced by various factors including the cold workability and work hardenability of the material to be shaped, and varies with the geometry of the rolling elements and the alloy components of their raw material.

While the cold workability of the material to be shaped depends on its C, Cr and Mn contents, the constituent material of the rolling bearing that attains the second object of the present invention has the minimum necessary kinds of alloy components set for assuring the desired capabilities of the bearing including its life and, hence, the material has better workability than conventional bearing steel materials, thus contributing to a longer life of the die.

With these points taken into account, the rolling elements in the rolling bearing that attains the second object of the present invention shall, in a desired case, be shaped from wires by cold die forging (header working).

Processing the inner and outer races

As in the case of manufacturing normal small-sized rolling bearings, the inner and outer races of the rolling bearing that attains the second object of the present invention shall be produced by first hot (or warm) forging the raw material, softening it and thereafter subjecting it to turning.

In the turning step, the life of the tool varies with how easily the material can be processed by turning. As already mentioned, the constituent material of the rolling bearing that attains the second object of the present invention has the minimum necessary kinds of alloy components set for insuring the desired capabilities of the bearing including its life and, hence, it has better workability than conventional bearing steels and causes the tool to wear in a smaller amount during turning.

Compositional ranges of the surface layer of a complete bearing

In order to realize a long-lived rolling bearing, the surface hardness of the complete product must have an optimal relationship with the content of $\gamma_R$. To insure that the materials and processing costs are held down to the lowest possible content, the rolling bearing that attains the second object of the present invention has the alloy components set in the minimum necessary ranges for both the rolling elements and the inner and outer races. Hence, carbonitriding causes both C and N to solve in the matrix and, in particular, N solves in an appropriate amount to provide the necessary contents of hardness and $\gamma_R$ for insuring prolonged life.

Stated more specifically, if the rolling elements and the inner and outer races in a complete form as produced by carbonitriding has a C content less than 0.8 wt % in the surface layer, the surface hardness that can be attained is insufficient to achieve a longer life. The C content in the surface layer of the complete product can be increased up to 1.4 wt % without any problems if the stated C content is combined with the above-described conditions. However, if the C content exceeds 1.4 wt %, $M_3C$ and Other macro carbides precipitate and become a start point for cracking which, in turn, shortens the rolling life considerably.

If the N content in the surface layer of the complete product is less than 0.05 wt %, the solid solution N is insufficient to achieve adequate contents of surface hardness and $\gamma_R$, thus failing to extend the life of the bearing. On the other hand, if the N content in the surface layer of the complete product exceeds 0.3 wt %, heat treatments must be performed for a prolonged time or, alternatively, the N content in the unground surface layer as formed by carbonitriding tends to increase due to the increased N potential and, in either way, the grindability of the final product deteriorates considerably.

For the reasons stated above, the rolling bearing that attains the second object of the present invention is so adapted that not only the rolling elements but also the inner and outer races in a complete form preferably have a carbon concentration of 0.8 wt % to 1.4 wt % and a nitrogen concentration of 0.05 wt % to 0.3 wt % in the surface layer.

Next, there is described the reasons for limiting the compositional range of the alloy components to be used in a special kind of the rolling bearing that attains the second object of the present invention, namely, a rolling bearing that is suitable for use in applications where particularly high wear resistance is required.

The primary object of present invention, which relates to this special kind of the rolling bearing, partly overlaps the above-stated object of providing "a rolling bearing that can operate for a longer period of time under lubrication in the presence of foreign matter and which can be produced at low cost". Accordingly, the two objects of the present invention are identical in the chemical composition of the rolling elements. However, slight differences exist in the composition of the raw material for the inner and outer races; stated more specifically, the Cr contents of the inner and outer races are limited numerically in relation to the Cr content of the rolling elements. As the result of the intensive studies conducted to investigate the wear resistance of bearings and their life under lubrication in the presence of foreign matter, the present inventors found that when the rolling elements were formed of a carbonitrided low-cost alloy steel containing 0.1–0.6 wt % of Cr whereas either the inner race or the outer race, or both races were made of a bearing or case-hardening steel containing more Cr than in the rolling elements by at least 0.2 wt %, a bearing could be produced that was more wear resistant than those using the bearing or case-hardening material in all parts and which yet had a long life. On the basis of this finding, one can provide a rolling bearing that has sufficiently high wear resistance to withstand use under severe conditions of sliding between each of the rolling elements and the inner or outer rase and the bearing also meets the requirement for longer life under lubrication in the presence of foreign matter and lower production cost.

Contents of C, Cr, Mn and Si in the rolling elements

The contents of these components are identical to those already defined for the rolling elements of the bearing that attains the second object of the invention. The explanation is omitted here.

Cr content in the inner and outer races

If the bearing steel SUJ 2 is used not only in the rolling elements but also in the inner and outer races, the product tends to have a shorter rolling life under lubrication in the presence of foreign matter and to exhibit lower wear resistance compared with the bearing that uses the conventional case-hardening steel SCr 420 in not only the rolling elements but also the inner and outer races after carburizing or carbonitriding. Even in the case where the two materials are combined to form the rolling bearing, SUJ 2 tends to wear more extensively and to have a shorter life than Scr 420. This means that the wear resistance of rolling bearings cannot be improved by the simple combination of a material having comparatively high wear resistance with a material having a smaller wear resistance.

As the result of the intensive studies conducted to investigate the wear resistance of bearings and their life under lubrication in the presence of foreign matter, the present inventors found that when the rolling elements were formed of a carbonitrided low-cost alloy steel containing 0.1–0.6 wt % of Cr whereas either the inner race or the outer race, or both races were made of a bearing steel or case-hardening steel containing more Cr than in the rolling elements by at least 0.2 wt %, a bearing could be produced that was more wear resistant than those using the bearing steel or case-hardening material in all parts and which yet had a long life.

The material to be used in the inner and outer races contains more Cr than the material of the rolling elements by at least 0.2 wt %. In addition, the rolling elements have a relatively low Cr content which is not more than 0.6 wt %. Therefore, due to the thermal conductivity difference between mating parts, the thermal diffusion on the surface of their friction is prone to progress toward the rolling elements. This retards the temper softening of the inner or outer race, thereby providing better wear resistance than in the case where the same material is used in all parts of the bearing including not only the inner and outer races but also the rolling elements. If the difference in Cr content is 0.4 wt % or more, the intended effect is fully exhibited; therefore, the difference in Cr content is desirably at least 0.4 wt %.

The material to be used in the rolling elements is a low-cost alloy steel having low Cr content but since it is carbonitrided, the rolling elements have a suitable amount of $\gamma_R$ to be capable of operating for a prolonged time under lubrication in the presence of foreign matter. In addition, the inherent advantageous effect of nitrogen provides a surface layer that is improved in wear resistance and the resisting property for temper softening. Accordingly, the wear resistance of the rolling elements is not impaired even if the mating part is improved in its wear resistance.

However, if the Cr content of the inner and outer races becomes higher than that of the rolling elements by more than 2.0 wt %, the wear resistance of the inner and outer races is further improved and adverse effects such as frictional heat work so extensively on the surfaces of the rolling elements that the retained austenite ($\gamma_R$) in the surface layer decomposes or the hardness of the surface layer reduces. As a result, the wear resistance of the rolling bearing or its operating life under lubrication in the presence of foreign matter decreases. Another problem with the increased Cr content is that the workability of the raw material deteriorates whereas the materials cost increases.

For the reasons stated above, the Cr content of the material for the inner and outer races should preferably be higher than that of the rolling elements by 0.2–2.0 wt %, more preferably 0.4–2.0 wt %.

Contents of other alloy components in the inner and outer races

The rolling bearing that attains the second object of the present invention and which is particularly suitable for use in application where high wear resistance is required uses a low-cost and yet highly wear-resistant low-Cr steel in the rolling elements and combines it with the inner and outer races having the Cr content which is specified in relation to the Cr content of the rolling elements; as a result, wear resistance is improved not only in the rolling elements but also in the inner and outer races, so that the life of the bearing taken as a whole is extended. Hence, there is inherently no need to provide significant limitations on the chemical composition of the raw material for the inner and outer races except for the Cr content. However, considering the capabilities required by the bearing in the light of its overall costs including not only the materials cost but also the costs of processing, hear treatments and the like, it is desirable to specify a certain chemical composition for the raw material of the inner and outer races.

Thus, as for the C content in the raw material for the inner and outer races, if it is less than 0.3 wt %, the required time of carburizing or carbonitriding treatment is unduly extended to reduce the efficiency of these heat treatments. If, on the other hand, the C content exceeds 0.6 wt %, the amount of $\gamma_R$ in the core portion of either race increases to a more-than-necessary content, causing deterioration in its dimensional stability and, depending on the operating conditions, this leads to defects such as the development of creep in the inner race and the galling of the housing by the outer race. Therefore, the C content of the raw material for the inner and outer races is desirably set to fall within 0.3 wt % to 0.6 wt %. However, in certain cases such as bearing steels where the hardening treatment normally suffices to attain the necessary hardness for the bearing, there is no possibility for the amount of $\gamma_R$ in the deeper area to increase excessively and, in addition, the cost of such bearing steels is low; hence, they can be used in the inner and outer races even if they contain more than 0.6 wt % of C.

Further, as for Mn content in the raw material of the inner and outer races, it improves hardenability and it is also a retained austenite forming element which is effective in extending the rolling life of a bearing under lubrication in the presence of foreign matter. Hence, the Mn content is desirably set to be at least 0.3 wt %. On the other hand, Mn is an element that strengthens the ferrite in the raw material and its cold workability deteriorates if the Mn content increases. Hence, the Mn content of the raw material for the inner and outer races is desirably specified to fall Within 0.3 wt % to 1.2 wt %.

Moreover, as for Si content in the raw material for the inner and outer races, it works as a deoxidizer in the steelmaking process, thereby providing improved hardenability and strengthening the matrix martensite; thus, Si is an element effective in extending the life of bearings and preferably contained in an amount of at least 0.1 wt %. On the other hand, excessive Si not only deteriorates machinability, forgeability and cold workability but also causes a significant decrease in the depth of diffusion during carbonitriding. Hence, the Si content of the raw material for the inner and outer races is desirably set to fall within 0.1 wt % to 0.5 wt %.

Next, there are now described the effects of the alloy components used in the rolling bearing that attains the third object of the present invention, as well as the criticality of the numerical limitations on those components.

Moreover, as for each elements of C, Si and Mn, it is similar to the second object of the present invention. Accordingly, the effects and the criticality of these elements are omitted to describe below in the third object of the present invention.

Chromium content

Chromium improves the hardenability and achieves solid-solution hardening of the matrix. In addition, it helps carbides, nitrides and carbonitrides to precipitate on the surface layer of the bearing as a result of carbonitriding, thereby improving its rolling fatigue life and wear resistance characteristics. The preferable lower limit of the Cr content is set to 0.5 wt % because the intended effect of Cr addition is not attained with less than 0.5 wt % of Cr. On the other hand, if Cr is added in an excessive amount, Cr oxides form on the surface and retard the entrance of carbon and nitrogen into the surface during carbonitriding, so that the efficiency of heat treatments deteriorates. Hence, the upper limit of the Cr content is set to 3.0 wt %.

Molybdenum content

Molybdenum increases the resistance to temper softening and, like Cr, it is an element effective in allowing carbides, nitrides and carbonitrides to precipitate on the surface layer of the bearing as a result of carbonitriding, thereby improving its rolling fatigue life and wear resistance characteristics. The upper limit of the Mo content is set to 3.0 wt % because excessive addition of Mo not only deteriorates the plastic workability of the raw material but also increases the materials cost.

Vanadium content

Like molybdenum, vanadium increases the resistance to temper softening and it is also an element effective in generating very fine-grained and hard VC carbides, as well as nitrides and carbonitrides as a result of carbonitriding, thereby improving the wear resistance and rolling fatigue life characteristics of the bearing on account of the dispersion strengthening effect of those compounds. The upper limit of the V content is set to 2.0 wt % because excessive addition of V not only deteriorates the machinability of the raw material but also increases the materials cost.

Nickel content

Nickel is an element that solves in the matrix to prove effective in improving its toughness. However, if it is added in an excessive amount, the amount of $\gamma_R$ in the surface layer increases so much as to lower its hardness. Therefore, the upper limit of the Ni content is set to 2.0 wt %.

Compositional ranges of the surface layer of a complete bearing

As described above, it is conventionally known to improve the wear resistance of a bearing by adding sufficiently large amounts of carbide-forming elements such as Cr, Mo and V to precipitate carbides on the surface layer of the bearing but the bearing manufactured by this method is very expensive since not only does it contain large amounts of alloying elements but the cost of heat treatment is also high. Under the circumstances, the present inventors noted the concentrations of carbon and nitrogen in the surface layer of a bearing and studied the relationship between the bearing's life and its wear resistance. As a result, it has been found that the wear resistance of the bearing can be remarkably improved by controlling the carbon concentration of the bearing's surface layer to fall within an appropriate range.

As FIG. 1 shows specifically, if the surface layer formed by carbonitriding has a nitrogen concentration of preferably 0.3 wt % or more, the dispersion strengthening effect of very fine-grained carbides, nitrides and carbonitrides achieve a remarkable improvement in wear resistance. If the nitrogen concentration of the surface layer is unduly high, the amount of $\gamma_R$ increases so much as to reduce the hardness of the bearing-to such a low level that it is no longer suitable for use as a rolling bearing in steelmaking and other applications where service under low-speed, heavy-load conditions is predominant. Hence, the nitrogen concentration of the surface layer must be adjusted not to exceed 0.7 wt %, preferably.

If the matrix is to be given a sufficient strength to insure an extended life, the carbon concentration of the surface layer must preferably be at least 0.8 wt %. However, if the carbon concentration of the surface layer exceeds 1.5 wt %, the combination with the conditions to be described below causes reticulate coarse carbides to precipitate at crystal's grain boundaries, where stress concentration occurs to shorten the rolling fatigue life of the bearing.

For the reasons stated above, the rolling bearing that attains the third object of the present invention is so adapted that at least one member selected from the group consisting of rolling elements, an inner race and an outer race in a complete form preferably has a carbon concentration of 0.8 wt % to 1.5 wt % and a nitrogen concentration of 0.3 wt % to 0.7 wt % in the surface layer.

Moreover, a wear-resistant bearing that attains the third object of the present invention can be produced at an even lower cost by using an alloy steel of the above-described composition in only a fixed race of the inner and outer races. In certain applications as exemplified by use in continuous casting machines where the occurrence of cracking in bearings should be avoided as much as possible, the carbon concentration of the matrix is desirably held to 0.5 wt % or less.

Next, there will be described in below the criticality of numerical limitations and other elements of the rolling bearing that attains the fourth object.

This fourth object of the present invention is to provide a rolling bearing whose performance is approximately intermediate between those of the bearings that attain the already described second and third objects, or a rolling bearing that is suitable for use under high-speed, light-load conditions and which satisfies both requirements for high wear resistance and low cost.

When bearing steels such as SUJ 2 and case hardening steels equivalent to SCr 420, both being commonly used as constituent materials for rolling bearings, are carbonitrided, the wear resistance of these materials improves greatly with the increasing nitrogen concentration but, on the other hand, their grindability tends to deteriorate remarkably and the processing cost increases accordingly.

To resolve these conflicts, the present inventors conducted intensive studies on the correlation between various factors involved, such as the components of the raw material, the nitrogen concentration, the grindability and the wear resistance of that raw material. As a result, it has been found that by controlling the Cr content and the amount of nitrogen addition to fall within appropriate ranges, a rolling bearing that is improved in the life and wear resistance characteristics under lubrication in the presence of foreign matter and which is satisfactory in various aspects of working operations including grinding can be manufactured at low cost.

Carbon content

Carbon is an element necessary to attain the core strength required by bearings. However, if the carbon content of the raw material exceeds 0.9 wt %, soaking for eliminating macro carbides and segregation becomes necessary in the steelmaking process and this adds to the materials cost. Further, the resistance to deformation tends to increase with the increasing carbon content and the cold workability and machinability deteriorates accordingly. Therefore, the upper limit of the carbon content is preferably set to 0.9 wt %. If the carbon content of the raw material is less than 0.3 wt %, prolonged carburization (or carbonitriding) is necessary and the efficiency of heat treatments decreases. Therefore, the preferable lower limit of the carbon content is set to 0.3 wt %. However, if the raw material of interest is to be used to make the inner and outer races and if their dimensional stability and core toughness are particularly important, the carbon content of the raw material is desirably set to 0.6 wt % and below.

Silicon content

Silicon is an element necessary to be used as a deoxidizer during steelmaking; it is also an element that is effective in improving the hardenability, strengthening the matrix martensite and enhancing the resistance to temper softening. To insure these effects, silicon must be added in an amount of 0.1 wt % and more. However, if the addition of silicon is excessive, the cold workability and machinability of the raw material deteriorate and the depth of carbon and nitrogen diffusion that can be achieved by carbonitriding does decrease, so that the cost of heat treatments increases. Therefore, the preferable upper limit of the silicon content is set to 0.7 wt %.

Manganese content

Manganese is an element effective in improving the hardenability. In the present invention, carbonitriding is effected to form fine-grained carbides on the surface of a complete bearing, so that its wear resistance is improved. It has been found that the addition of Mn prevents deterioration in grindability even if carbonitriding is effected. To insure this effect, manganese must preferably be added in an amount of 0.5 wt % and more. However, excessive addition of manganese deteriorates the cold workability and machinability of the raw material. Therefore, the upper limit of the manganese content is set to 1.5 wt %.

Chromium content

Chromium is an element effective in improving the hardenability and the resistance to temper softening and must be added in an amount of 0.1 wt % or more. The carbonitriding to be effected in presence of Cr forms nitrides on the surface of a complete bearing, so that its wear resistance is improved. However, if the ratio of Cr to N exceeds a certain value, the grindability of the raw material deteriorates. What is more, excessive addition of chromium simply results in a higher materials cost; in addition, the depth of diffusion of carbon and nitrogen that can be achieved by carbonitriding does decrease, so that the cost of heat treatment increases. Therefore, the preferable upper limit of the chromium content is set to 0.8 wt %.

Carbon content of the surface of a complete bearing

Bearings in a complete form as obtained by carbonitriding are usually required to have a carbon concentration of 0.8 wt % and more in the surface in order to insure the necessary hardness. In the present invention, the upper limit of the nitrogen content is set at an increased level in order to satisfy both requirements for longer life and higher wear resistance and, therefore, the minimum necessary surface carbon content is 0.6 wt %. However, if the surface carbon content exceeds 1.2 wt %, the total amount of solid solutions of carbon and nitrogen becomes excessive. In addition, depending on the treating conditions, $\gamma_R$ may form in a more-than-necessary amount and the surface hardness decreases rather than increases or proeutectoid crystals are formed. As a result, the rolling life of the bearing is shortened. Therefore, the upper limit of the carbon content of the surface of a completed bearing is set to 1.2 wt % as a preferable value.

Nitrogen content of the surface of a complete bearing

If the nitrogen content of the surface of a complete bearing is less than 0.2 wt %, the amount of solid solution of nitrogen is insufficient to satisfy both requirements for longer life and higher wear resistance, simultaneously. Therefore, the lower limit of the nitrogen content is preferably set to 0.2 wt %. On the other hand, as the nitrogen content increases, nitrides start to precipitate and the wear resistance improves. However, depending on the amount of Cr addition, the improvement in wear resistance may be accompanied by deterioration in grindability and, if the N content exceeds 0.9 wt %, the grindability can no longer be improved by reducing the addition of Cr.

Cr+N, or the total content of Cr and nitrogen

Chromium, when added together with nitrogen, forms nitrides or carbonitrides to improve wear resistance but, on the other hand, grindability deteriorates. The present inventors found experimentally that when the sum of Cr in the raw material and N in the surface layer was within an appropriate range, both grindability and wear resistance were improved. For details of the experiment, see the Examples that follow.

To state the conclusion, it has been found that assuming that the N content of the surface layer is 0.2 wt % or more, grindability deteriorates rapidly if Cr+N exceeds 1.0 wt % whereas wear resistance deteriorates remarkably if Cr+N is less than 0.4 wt %. Therefore, the appropriate range of Cr+N which can satisfy both requirements for good grindability and high wear resistance has been specified to fall within 0.4 to 1.0 wt %. Even if Cr+N is within the stated range, the desired wear resistance is not attained if the content of N in the surface layer is 0.2 wt % or more.

EXAMPLES (A-1) The bearing that attains the second object of the present invention will now be described with reference to examples.

(1) Components of the raw material of rolling elements, the need for soaking, and the life of a die:

Steel species within the scope of the present invention and comparative samples were evaluated for the need to perform soaking and the life of a die used in cold die working.

Soaking

Samples of raw material in a billet form were sectioned and examined both macroscopically and microscopically to check for the presence of macro carbides and thick banded structures of segregation which would be deleterious to the life characteristic of bearings. The results are shown in Table 1.

The life of die

Cold die forging (upsetting) was performed under the following conditions.

| | |
|---|---|
| Die | V30 (JIS B4053) |
| Degree of upsetting | 15–20% |
| Working efficiency | 300–400 pieces per minute |
| Lubrication | Zinc phosphate film + lubricant |

The steel species under test were worked under these conditions and the life of a die was held to have come to an end when cracks or other failures that occurred in the die caused flaws or other deformations to develop in the worked piece. The life of the die was expressed in terms of the number of pieces that could be worked before those phenomena occurred. The results are also shown in Table 1.

TABLE 1

| Steel species | C (wt %) | Si (wt %) | Mn (wt %) | Cr (wt %) | Soaking | Die life ($\times 10^3$ pieces) |
|---|---|---|---|---|---|---|
| Invention | | | | | | |
| C1 | 0.75 | 0.48 | 0.78 | 0.45 | not necessary | 216 |
| C2 | 0.84 | 0.51 | 0.96 | 0.28 | not necessary | 207 |
| C9 | 0.72 | 0.49 | 0.81 | 0.35 | not necessary | 226 |
| C10 | 0.88 | 0.48 | 0.80 | 0.35 | not necessary | 206 |
| C11 | 0.81 | 0.50 | 0.52 | 0.34 | not necessary | 230 |
| C12 | 0.80 | 0.51 | 1.07 | 0.35 | not necessary | 202 |
| C13 | 0.82 | 0.50 | 0.89 | 0.12 | not necessary | 219 |
| C14 | 0.79 | 0.49 | 0.79 | 0.58 | not necessary | 201 |
| Comparison | | | | | | |
| C3 | 0.53 | 0.46 | 1.02 | 0.48 | not necessary | 235 |
| C4 | 1.05 | 0.49 | 0.75 | 0.30 | not necessary | 73 |
| C5 | 0.81 | 0.45 | 0.44 | 0.56 | not necessary | 223 |
| C6 | 0.82 | 0.47 | 1.22 | 0.32 | not necessary | 85 |
| C7 | 0.84 | 0.50 | 1.03 | 0.05 | not necessary | 209 |
| C8 | 0.82 | 0.49 | 0.83 | 0.75 | necessary | 93 |

Soaking was considered to be necessary when the C or Cr content exceeded 0.9 wt % or 0.6 wt %, respectively.

When the C, Mn or Cr content exceeded 0.9 wt %, 1.1 wt % or 0.6 wt %, respectively, the workability deteriorated and the life of the die was very short.

(2) Components of the raw material of inner and outer races and the life of a machining (cutting) tool:

Steel species used within the scope of the present invention and comparative samples were evaluated for the life of the tool used in a machining (cutting) step.

| Test conditions | |
|---|---|
| Cutting machine | high-speed lathe |
| Tool | P10 (JIS B4053) |
| Cutting speeD | 180–220 m/sec |
| Feed | 0.2–0.3 mm/rev |
| Depth of cut | 0.6–1.0 mm |

| Test conditions | |
|---|---|
| Softening: | |
| Annealing profile X: | heating and holding temperature (max. temp. 700–720° C.; total processing time from heating to cooling, 8–10 hours |
| Annealing profile Y: | heating and holding temperature (max. temp. 740–760° C.; total processing time from heating to cooling, 8–10 hours |

| Test conditions | |
|---|---|
| Annealing profile Z | heating and holding temperature (max. temp. 670–690° C.; total processing time from heating to cooling, 8–10 hours (normal annealing) |

Under the conditions indicated above, the samples were cut in accordance with the cutting test method specified in JIS B4011 and the life of the cutting tool was held to have come to an end when the flank wear of the cutting tool reached 0.2 mm. The results are shown in Table 2.

TABLE 2

| Steel species | C (wt %) | Si (wt %) | Mn (wt %) | Cr (wt %) | Annealing profile | Tool life (min) |
|---|---|---|---|---|---|---|
| Invention | | | | | | |
| R1 | 0.42 | 0.49 | 1.10 | 0.28 | Z | 156 |
| R2 | 0.55 | 0.52 | 0.85 | 0.48 | Z | 135 |
| R9 | 0.32 | 0.48 | 0.91 | 0.36 | Z | 189 |
| R10 | 0.57 | 0.51 | 0.89 | 0.35 | Z | 103 |
| R11 | 0.45 | 0.52 | 0.61 | 0.33 | Z | 166 |
| R12 | 0.46 | 0.49 | 1.17 | 0.35 | Z | 105 |
| R13 | 0.44 | 0.48 | 0.90 | 0.13 | Z | 128 |
| R14 | 0.46 | 0.50 | 0.89 | 0.56 | Z | 103 |
| R15 | 0.42 | 0.47 | 1.30 | 0.31 | Z | 100 |
| R16 | 0.35 | 0.49 | 1.48 | 0.35 | X | 114 |
| R17 | 0.46 | 0.49 | 1.46 | 0.34 | Y | 113 |
| R18 | 0.56 | 0.47 | 1.48 | 0.35 | Y | 108 |
| Comparison | | | | | | |
| R3 | 0.22 | 0.48 | 1.12 | 0.45 | Z | 186 |
| R4 | 0.73 | 0.46 | 0.87 | 0.36 | Z | 28 |
| R5 | 0.51 | 0.51 | 0.41 | 0.55 | Z | 168 |
| R6 | 0.50 | 0.50 | 1.33 | 0.28 | Z | 22 |
| R7 | 0.48 | 0.47 | 1.10 | 0.04 | Z | 126 |
| R8 | 0.52 | 0.48 | 0.87 | 0.72 | Z | 35 |
| R19 | 0.36 | 0.48 | 1.65 | 0.45 | X | 21 |
| R20 | 0.55 | 0.46 | 1.58 | 0.36 | Y | 23 |
| R21 | 0.52 | 0.48 | 1.63 | 0.72 | Y | 26 |

When the C, Mn or Cr content exceeded 0.6 wt %, 1.5 wt % or 0.6 wt %, respectively, the machinability deteriorated and the life of the cutting tool was very short. When the Mn content exceeded 1.3 wt % (steel species, R6), the tool life was short in the case of normal annealing profile Z; however, the tool life was found to be satisfactory up to a Mn content of 1.5 wt % when the C content was no more than 0.4 wt % (in annealing profile X) or within the range 0.4–0.6 wt % (in annealing profile Y).

(3) Quality of rolling elements and inner and outer races after heat treatment:

Samples within the scope of the present invention were provided and comparative samples for each of the rolling elements and inner and outer races and subjected to various heat treatments under different conditions for evaluating the quality of each of the heat treated samples. The conditions of the heat treatments were as shown in Table 3.

TABLE 3

| Designation | Temp. for treatment (°C.) | Time of treatment | Treating condition |
|---|---|---|---|
| A | 850–900 | 1–2 | Carbonitriding |
| B | 870–930 | 2–4 | Carbonitriding |
| C | 850–900 | 5–7 | Carbonitriding |
| D | 930–960 | 5–7 | Normal carburization |
| E | 930–960 | 5–7 | High-concentration carburization |

(Heat treatment A)

Treated at a temperature of 850°–900° C. for 1–2 h under the following conditions: carbonitriding in an endothermic gas atmosphere in the presence of 0.3–0.7% enriched gas and 3–10% ammonia gas. Following directly hardening, tempering was conducted at 160°–200° C. for 2 h.

(Heat treatment B)

Treated at a temperature of 870°–930° C. for 2–4 h under the following conditions: carbonitriding in an endothermic gas atmosphere in the presence of 0.3–0.7% enriched gas and 3–10% ammonia gas. Following direct hardening, tempering was conducted at 160°–200° C. for 2 h.

(Heat treatment C)

Treated at a temperature of 850°–900° C. for 5–7 h under the following conditions: carbonitriding in an endothermic gas atmosphere in the presence of 0.3–0.7 % enriched gas and 3–10% ammonia gas. Following directly hardening, tempering was conducted at 160°–200° C. for 2 h.

(Heat treatment D)

Subjected to normal carburization at a temperature of 930°–960° C. for 5–7 h, then left to cool to room temperature, held at 840°–860° C. for 30 min, then hardened, followed by tempering at 160°–200° C. for 2 h.

(Heat treatment E)

Subjected to high-concentration carburization at a temperature of 930°–960° C. for 5–7 h to achieve a carbon potential $C_P$ of 1.2–1.4 (which was 0.9–1.0 in normal carburization), then left to cool to room temperature, held at 840°–860° C. for 30 min, then hardened, followed by tempering at 160°–200° C. for 2 h.

The rolling elements within the scope of the present invention were subjected to heat treatment A. Since the carbonitriding conducted for a short time was immediately followed by directly hardening, the cost of heat treatment A was almost comparable to that of normal hardening. In addition, due to the small amount of cutting allowable portions, both C and N remained in sufficient amounts on the surface of the complete product to achieve a remarkable improvement in performance, compared to the result of normal hardening.

When the carbonitriding temperature exceeded 900° C., $\gamma_R$ was generated in a more-than-necessary amount in the surface of the complete product and either hardness or the toughness of the core portion dropped to impair the performance and life characteristics of the bearing. On the other hand, when the carbonitriding temperature was lower than 850° C. or when the treatment time was unduly prolonged, N was incorporated in a more-than-necessary amount in the hardened surface, thereby causing considerable deterioration in grindability.

The inner and outer races within the scope of the present invention were subjected to heat treatment B. The use of a medium-carbon steel permitted a shorter heat treatment than when carburization or carbonitriding was conducted by normal methods.

When the carbonitriding temperature exceeded 930° C., hardness dropped as in the case of the rolling elements; in addition, even the use of a medium-carbon steel was incapable of preventing the coarsening of the crystal grains in the core portion and for this and other reasons, the toughness dropped to cause deterioration in the life performance and characteristics of the bearing. On the other hand, when the carbonitriding temperature was lower than 870° C. or when the treatment time was unduly prolonged, grindability deteriorated remarkably as in the case of the rolling elements.

In the present invention, directly hardening is employed to ensure cost effectiveness. As for the heat treatment of inner and outer races, depending on the designation of a specific bearing, secondary hardening is performed in order to correct any deformation that may have occurred as a result of the heat treatment. This is disadvantageous from the viewpoint of the cost of heat treatments but, taken as a whole, the correction of the deformation contributes to a lower grinding cost, which may sometimes prove to be advantageous. In addition, the quality of the heat treated product is stabilized by secondary hardening and its performance is at least comparable to that of directly hardened products.

Table 4 shows the quality of heat treated rolling elements within the scope of examples, as well as that of comparative samples.

TABLE 4

| No. | Steel species | Heat treatment | C (wt %) | N (wt %) |
|---|---|---|---|---|
| Invention | | | | |
| 1 | C1 | A | 0.86 | 0.23 |
| 2 | C2 | A | 0.98 | 0.19 |
| 3 | C3 | A | 0.81 | 0.23 |
| Comparison | | | | |
| 4 | C5 | A | 0.96 | 0.21 |
| 5 | C7 | A | 0.97 | 0.20 |

The comparative samples were selected from those listed in Table 1 which had a long life of the die. Steel species C4, C6 and C8 were poor in workability and, hence, were not subjected to subsequent heat treatments or a life test. The C and N contents indicated in Table 4 were those in the surface layer of complete products.

(4) Test for grinding the inner and outer races:

Steel species within the scope of the present invention and comparative samples were tested for their grindability.

| Test conditions | |
|---|---|
| Grinding wheel | WA100 |
| Grinding fluid | soluble type |
| Peripheral grinding speed | 2,800–3,000 m/min |

Samples equivalent to the inner raceway surfaces of bearings made from various steel species were ground with the grinding wheel under the conditions set forth above and the grinding wheel was checked for any indication of the grains "getting dull" and the wheel becoming "loaded". The number of the samples that could be ground before the dressing of the wheel became necessary was counted.

Table 5 shows the results of the grinding test for both the present invention samples and the comparative samples. The comparative samples were selected from those listed in Table 2 which had a long tool life. As in the case of the rolling elements, steel species R4, R6, R8 and R19–R21 were not subjected to a life test. The C and N contents indicated in Table 5 were those in the surface layer of complete products.

TABLE 5

| No. | Steel species | Heat treatment | C (wt %) | N (wt %) | Grindability (No. of pieces) |
|---|---|---|---|---|---|
| Invention | | | | | |
| 6 | R1 | B | 0.96 | 0.23 | 24 |
| 7 | R2 | B | 0.98 | 0.24 | 25 |
| 14 | R16 | B | 0.93 | 0.23 | 25 |
| 15 | R17 | B | 0.95 | 0.24 | 24 |
| 16 | R18 | B | 0.98 | 0.23 | 24 |
| Comparison | | | | | |
| 8 | R2 | C | 1.05 | 0.61 | 7 |
| 9 | R2 | D | 1.08 | 0.00 | 29 |
| 10 | R2 | E | 1.46 | 0.00 | 26 |
| 11 | R3 | B | 0.78 | 0.26 | 26 |
| 12 | R5 | B | 0.89 | 0.26 | 25 |
| 13 | R7 | B | 0.90 | 0.25 | 25 |

Comparative sample No. 8 had such a high surface N content that its grindability was low.

(5) Testing the rolling elements and inner and outer races for thrust life:

Steel species within the scope of the present invention and comparative samples were subjected to a thrust life test under lubrication in the presence of added foreign matter. The test machine was a thrust type test machine that was described on chap. 10, page 21 of "Tokushuko Binran (Handbook of Specialty Steels)", First Ed., compiled by Electrosteelmaking Research Institute, published by Rikogakusha, May 25, 1969.

| Test conditions | |
|---|---|
| Contract pressure | 4,900 MPa |
| Rotating speed | 3,000 cpm |
| Lubricant | #68 turbine oil |
| Foreign matter | $Fe_3C$-base particles (hardness, $H_R C$ 52; size, 74–147 μm) were added to the lubricant in an amount of 300 ppm. |

Table 6 shows representative data for the results of the life test, together with the data on comparative samples.

TABLE 6

| Bearing No. | Rolling element No. | Inner & outer race No. | $L_{10}$ life (× $10^6$ cycles) |
|---|---|---|---|
| Invention | | | |
| 1 | 1 | 6 | 29.8 |
| 2 | 1 | 7 | 30.2 |
| Comparison | | | |
| 3 | 1 | 8 | 31.5 |
| 4 | 1 | 9 | 9.6 |
| 5 | 1 | 10 | 6.3 |
| 6 | 1 | 11 | 4.2 |
| 7 | 1 | 12 | 10.2 |
| 8 | 1 | 13 | 5.2 |
| Invention | | | |
| 9 | 2 | 6 | 30.5 |
| 10 | 2 | 7 | 29.4 |
| Comparison | | | |
| 11 | 3 | 6 | 15.3 |
| 12 | 3 | 7 | 16.5 |
| 13 | 4 | 6 | 10.6 |
| 14 | 4 | 7 | 9.5 |
| 15 | 5 | 6 | 6.9 |
| 16 | 5 | 7 | 7.2 |
| 17 | 6 | 6 | 12.2 |
| Invention | | | |
| 18 | 2 | 14 | 30.3 |
| 19 | 2 | 15 | 31.2 |
| 20 | 2 | 16 | 31.7 |

The life test was conducted on the rolling element samples listed in Table 4 and the inner or outer race samples TP listed in Table 5 (actually, a disk TP equivalent to an outer race was used in the test which was a thrust life test). In bearing sample Nos. 1, 2, 9, 10 and 18–20, rolling element samples within the scope of the present invention were combined with inner or outer race sample TP which were also within the scope of the present invention and those bearing samples were long-lived, could be prepared at low cost and exhibited high performance.

Comparative bearing No. 3 was also long-lived but the inner or outer race was so low in grindability that it could only be prepared at high cost.

Comparative bearing Nos. 4 and 5 had the inner or outer race carburized, so they did not have an adequate N content in the surface. In comparative bearing No. 7, the raw material for the inner or outer race had such a low Mn content that the amount of $\gamma_R$ in the inner or outer race was insufficient to ensure a satisfactory life under lubrication in the presence of foreign matter.

Comparative bearing No. 5 had an even shorter life since macro carbides (av. dia. >1 µm) which were deleterious to bearing's life formed in the inner or outer race.

Comparative bearing No. 6 had a low C content in the surface layer of the complete inner or outer race TP, whereas comparative bearing No. 8 was insufficient in Cr content to provide the surface hardness necessary to assure a longer life for the inner or outer race TP.

Comparative bearing Nos. 11 and 12 were so low in the C content of the raw material for the rolling elements that the carbonitriding treatment conducted for only a short time was incapable of providing a sufficient depth of hardened layer for ensuring long life; hence, the life of those bearings was rather short.

Comparative bearing Nos. 13 and 14 were so low in the Mn content of the raw material for the rolling elements that the amount of $\gamma_R$ was insufficient to ensure a satisfactory life under lubrication in the presence of foreign matter.

Comparative bearing Nos. 15 and 16 were so low in the Cr content of the raw material for the rolling elements that the surface hardness necessary to ensure a satisfactory life could not be attained.

Comparative bearing No. 17 was low not only in the C content of the raw material for the rolling elements but also in the C content of the surface layer, so the surface hardness necessary to ensure a satisfactory life could not be attained.

The life test was also conducted on bearing samples in which rolling element samples C9 to C14 of the invention (see Table 1) that had been subjected to heat treatment A were combined with inner or outer race samples R9 to R14 of the present invention (see Table 2) that had been subjected to heat treatment B. The $L_{10}$ life of those bearings was verified to be comparable to that of bearing sample Nos. 1, 2, 9 and 10. Inner or outer race samples R9 to R14 were also subjected to a grinding test under the same conditions as set forth above and the results were comparable to those for R1 and R2 shown in Table 5.

(A-2) The rolling bearing that attains the second object of the present invention and which is particularly suited to the use in applications were high wear resistance is required will now be described with reference to examples.

Rolling elements as well as inner and outer races were formed of various steel species under various conditions of heat treatments both within and outside the scope of the invention. The respective parts were combined to form samples of conical roller bearing (HR30307C), which were subjected to a wear test (L44649/610R) and a life test.

For the rolling elements, most of the steel species both within and outside the scope of the invention were selected from those listed in Table 1, supra. For the inner and outer races, see table 7 below. However, some of the rolling element samples outside the scope of the invention were made of steel species selected from Table 7.

TABLE 7

| Steel Species | C (wt %) | Si (wt %) | Mn (wt %) | Cr (wt %) |
|---|---|---|---|---|
| SCR440 | 0.41 | 0.25 | 0.80 | 1.05 |
| SCR420 | 0.20 | 0.25 | 0.78 | 1.02 |
| SCR4120 | 0.21 | 0.23 | 1.02 | 0.52 |
| SCR5140 | 0.41 | 0.26 | 0.81 | 0.80 |
| SUJ2 | 1.00 | 0.26 | 0.39 | 1.46 |
| S53CG | 0.53 | 0.17 | 0.81 | 0.05 |
| EX1 | 0.28 | 0.26 | 1.00 | 2.80 |

The conditions of the heat treatments were as follows.

(Heat treatment A)

It is the same treatment as described above.

(Heat treatment J)

Treated at a temperature of 900°–950° C. for 2–4 h under the following conditions, carbonitriding in an endothermic atmosphere in the presence of 0.3–0.7% enriched gas and 3–10% ammonia gas. Following directly hardening, tempering was effected at 160°–200° C. for 2 h.

(Heat treatment K)

Treated at a temperature of 900°–950° C. for 5–7 h under the following conditions: carbonitriding in an endothermic atmosphere in the presence of 0.3–0.7% enriched gas and 3–10% ammonia gas. Following directly hardening, tempering was effected at 160°–200° C. for 2 h.

(Heat treatment L)

Holding at a temperature of 830°–860° C. for 0.5–1 h was following first by hardening then by tempering at 160°–200° C. for 2 h.

(Heat treatment M)

Normal carburizing at a temperature of 930°–960° C. for 5–7 h was immediately followed by directly hardening then tempering was effected at 160°–200° C. for 2 h.

The rolling elements within the scope of the invention were subjected to heat treatment A.

The wear test conditions were as follows.

| Bearing under test | conical roller bearing (HR30307C) |
|---|---|
| Fixed ring | outer race |
| Load | axial load = 4900 N |
| Rotating speed | 500 rpm |
| Lubrication | with turbine oil (ISO VG 32) |
| Foreign matter added | $Fe_3C$-base particles (hardness, $H_RC$ 52; size, 20–50 μm) were added to the lubricant in an amount of 200 ppm. |

Each conical roller bearing sample was subjected to a test for evaluating the sliding wear between the larger collar plane of the inner race and the end face of each roller, with only an axial load being applied uniformly for the entire circumference. After it reaches 105 rotations, the inner race was measured for the geometry of its larger collar plane, so that the worn area was calculated with the initial geometry being superposed on the measured geometry; the worn area was converted to the volume of wear through multiplication by the length of contact with the rollers. The weight of all rollers was measured and subtracted from the initial value to determine the amount of wear. Evaluation was made in terms of wear rate, or the amount of wear divided by the distance of sliding.

Figure 6:
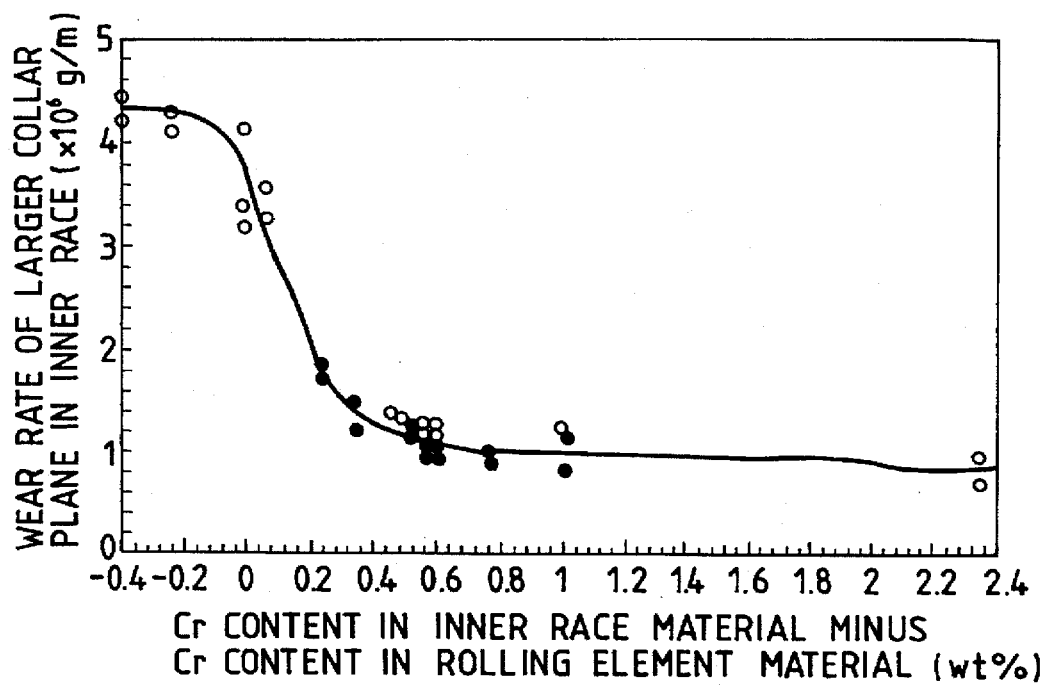
FIG. 6 is a graph showing the relationship between a difference in Cr content of each materials for inner race and rolling elements and a wear rate of a larger flange surface of the inner race.

FIG. 6 is a graph showing the wear rate of the larger collar plane of the inner race as a function of the differential Cr content between the materials for the inner race and the rolling elements. When the differential Cr content was 0.2 wt % or more, the wear rate of the larger collar plane decreased, indicating its satisfactory wear resistance.

The life test conditions wear as follows.

| Bearing under test | conical roller bearing (L44649/610R) |
|---|---|
| Fixed ring | outer race |
| Load | radial load = 12000 N axial load = 3500 N |
| Rotating speed | 500 cpm |
| Lubrication | with turbine oil (ISO VG32) |
| Foreign matter added | $Fe_3C$-base particles (hardness, $H_RC$ 52; size, 74–147 μm) were added to the lubricant in an amount of 200 ppm. |

Table 8 shows the steel species of the rolling elements and the inner and outer races, as well as the combinations of the heat treatments applied to these parts. Table 9 shows the results of the life and wear tests conducted on the respective samples.

TABLE 8

| | Bearing No. | Rolling Element No. | Steel Species | Heat Treatment | C wt % | N wt % | Inner Outer RaceNo. | Steel Species | Heat Treatment | C wt % | N wt % |
|---|---|---|---|---|---|---|---|---|---|---|---|
| Invention | 21 | 1 | C1 | A | 0.86 | 0.23 | 30 | SCR440 | J | 0.92 | 0.23 |
| | 22 | 1 | C1 | A | 0.86 | 0.23 | 31 | SCR440 | M | 0.97 | 0 |
| | 23 | 1 | C1 | A | 0.86 | 0.23 | 32 | SCR420 | K | 0.89 | 0.26 |
| | 24 | 1 | C1 | A | 0.86 | 0.23 | 33 | SCR420 | M | 0.94 | 0 |
| | 25 | 1 | C1 | A | 0.86 | 0.23 | 36 | SAE5140 | J | 0.94 | 0.21 |
| | 26 | 1 | C1 | A | 0.86 | 0.23 | 37 | SAE5140 | M | 0.99 | 0 |
| | 27 | 1 | C1 | A | 0.86 | 0.23 | 38 | SUJ2 | L | 1.00 | 0 |
| | 28 | 1 | C1 | A | 0.86 | 0.23 | 39 | SUJ2 | A | 1.16 | 0.29 |
| | 29 | 2 | C2 | A | 0.98 | 0.19 | 30 | SCR440 | J | 0.92 | 0.23 |
| | 30 | 2 | C2 | A | 0.98 | 0.19 | 31 | SCR440 | M | 0.97 | 0 |
| | 31 | 2 | C2 | A | 0.98 | 0.19 | 34 | SAE4120 | K | 0.86 | 0.24 |
| | 32 | 2 | C2 | A | 0.98 | 0.19 | 35 | SAE4120 | M | 0.91 | 0 |
| | 33 | 2 | C2 | A | 0.98 | 0.19 | 36 | SAE5140 | J | 0.94 | 0.21 |
| | 34 | 2 | C2 | A | 0.98 | 0.19 | 37 | SAE5140 | M | 0.99 | 0 |
| Comparison | 35 | 1 | C1 | A | 0.86 | 0.23 | 34 | SAE4120 | K | 0.86 | 0.24 |
| | 36 | 1 | C1 | A | 0.86 | 0.23 | 35 | SAE4120 | M | 0.91 | 0 |
| | 37 | 1 | C1 | A | 0.86 | 0.23 | 40 | S53CG | J | 0.91 | 0.19 |
| | 38 | 1 | C1 | A | 0.86 | 0.23 | 41 | S53CG | M | 0.98 | 0 |
| | 39 | 1 | C1 | A | 0.86 | 0.23 | 42 | Ex1 | K | 0.86 | 0.35 |
| | 40 | 1 | C1 | A | 0.86 | 0.23 | 43 | Ex1 | M | 0.96 | 0 |
| | 41 | 2 | C2 | A | 0.98 | 0.19 | 40 | S53CG | J | 0.91 | 0.19 |
| | 42 | 2 | C2 | A | 0.98 | 0.19 | 41 | S53CG | M | 0.98 | 0 |
| | 43 | 3 | C1 | L | 0.75 | 0 | 30 | SCR440 | J | 0.92 | 0.23 |
| | 44 | 3 | C1 | L | 0.75 | 0 | 51 | SCR440 | M | 0.97 | 0 |
| | 45 | 4 | C3 | A | 0.81 | 0.23 | 30 | SCR440 | J | 0.92 | 0.23 |
| | 46 | 4 | C3 | A | 0.81 | 0.23 | 51 | SCR440 | M | 0.97 | 0 |
| | 47 | 5 | C5 | A | 0.96 | 0.21 | 50 | SCR440 | J | 0.92 | 0.23 |
| | 48 | 5 | C5 | A | 0.96 | 0.21 | 32 | SCR420 | K | 0.89 | 0.26 |
| | 49 | 6 | C7 | A | 0.97 | 0.20 | 30 | SCR440 | J | 0.92 | 0.23 |
| | 50 | 7 | SCR440 | J | 0.98 | 0.23 | 30 | SCR440 | J | 0.92 | 0.23 |
| | 51 | 8 | SCR440 | M | 0.97 | 0 | 31 | SCR440 | M | 0.97 | 0 |
| | 52 | 9 | SUJ2 | L | 1.00 | 0 | 38 | SUJ2 | L | 1.00 | 0 |

TABLE 9

| Bearing No. | Inner & Outer race No. | Difference of Cr Content (wt %) | $L_{10}$ Life (cycle) | Wear Rate of Rolling Elements ($\times 10^{-6}$ g/m) | Wear Rate of Larger Collar Plans of Inner Race ($\times 10^{-6}$ g/m) |
|---|---|---|---|---|---|
| Invention | | | | | |
| 21 | 30 | 0.60 | 35.3 | 0.85 | 0.92 |
| 21 | 31 | 0.60 | 19.7 | 0.96 | 1.00 |
| 23 | 32 | 0.57 | 34.6 | 0.83 | 0.98 |
| 24 | 33 | 0.57 | 18.5 | 0.92 | 1.03 |
| 25 | 36 | 0.35 | 34.8 | 0.82 | 1.23 |
| 26 | 37 | 0.35 | 20.1 | 0.95 | 1.48 |
| 27 | 38 | 1.01 | 17.8 | 1.02 | 1.15 |
| 28 | 39 | 1.01 | 35.8 | 0.79 | 0.82 |
| 29 | 30 | 0.77 | 32.3 | 0.85 | 0.87 |
| 30 | 31 | 0.77 | 19.7 | 0.92 | 0.97 |
| 31 | 34 | 0.24 | 31.6 | 0.84 | 1.73 |
| 32 | 35 | 0.24 | 18.6 | 0.97 | 1.85 |
| 33 | 36 | 0.52 | 35.4 | 0.84 | 1.15 |
| 34 | 37 | 0.52 | 19.7 | 0.98 | 1.26 |
| Comparison | | | | | |
| 35 | 34 | 0.07 | 22.3 | 1.25 | 3.26 |
| 36 | 35 | 0.07 | 9.5 | 1.36 | 3.56 |
| 37 | 40 | −0.40 | 11.6 | 1.28 | 4.23 |
| 38 | 41 | −0.40 | 8.7 | 1.31 | 4.45 |
| 39 | 42 | 2.35 | 5.2 | 3.35 | 0.68 |
| 40 | 43 | 2.35 | 7.3 | 3.17 | 0.95 |
| 41 | 30 | −0.23 | 8.9 | 1.02 | 4.15 |
| 42 | 31 | −0.23 | 6.5 | 0.98 | 4.29 |
| 43 | 30 | 0.60 | 6.6 | 2.89 | 1.15 |
| 44 | 31 | 0.60 | 7.1 | 2.68 | 1.28 |
| 45 | 30 | 0.57 | 8.8 | 1.12 | 1.19 |
| 46 | 31 | 0.57 | 5.3 | 1.09 | 1.30 |
| 47 | 30 | 0.49 | 7.8 | 1.16 | 1.34 |
| 48 | 32 | 0.46 | 6.9 | 1.16 | 1.38 |
| 49 | 30 | 1.00 | 7.3 | 2.15 | 1.23 |
| 50 | 30 | 0 | 25.1 | 2.29 | 3.18 |
| 51 | 31 | 0 | 9.3 | 3.26 | 3.38 |
| 52 | 38 | 0 | 6.5 | 4.45 | 4.12 |

When rolling elements were combined with inner and outer races containing at least 0.2 wt % or more of Cr in accordance with the present invention, not only the rolling elements but also the larger collar plane of the inner race exhibited outstanding wear characteristics and the bearing assemblies were also long-lived.

Bearing sample Nos. 22, 24, 26, 30, 32 and 34 within the scope of the invention had the inner and outer races subjected to a carburizing treatment (M) and hence were short-lived compared with those samples which had the inner and outer races subjected to a carbonitriding treatment (J or K). However, these samples were by far long-lived compared with sample No. 51 outside the scope of the invention in which not only the rolling elements but also the inner and outer races were made of carburized steels.

In bearing sample No. 27, the rolling elements were combined with the inner and outer races made from normal hardened SUJ 2, so the life of this bearing was also shorter than the samples using carbonitrided inner and outer races. However, compared with sample No. 52 in which the rolling elements made of SUJ 2 were combined with the inner and outer races also made of SUJ 2, sample No. 27 remarkably had a longer life. Since normal hardening suffices as the heat treatment to be performed on the inner and outer races, this sample No. 27 may also be held as a preferred case with all factors including cost being taken into consideration.

As for the specific comparisons, bearing sample Nos. 35 and 50 had their life extended by combining carbonitrided rolling elements with carbonitrided inner and outer races; however, the wear rate of the inner race was unacceptably high since the Cr content of the inner and outer races minus that of the rolling elements was less than 0.2 wt %.

Bearing sample No. 36 was also unacceptably high in the wear rate of the inner race; in addition, the inner and outer races were carburized, so that they could not contain an appropriate amount of $\gamma_R$, nor did they have a longer life.

In bearing sample Nos. 39 and 40, the Cr content of the inner and outer races minus that of the rolling elements was in excess of 2.0 wt %, so that the rollers wore away and there could no extension of the bearing's life.

In bearing sample Nos. 43 and 44, the rollers were subjected to normal hardening, so they were not highly wear resistant and there could be no extension of the bearing's life.

In bearing sample Nos. 45 and 46, the C content of the raw material for the rolling elements was so low that an adequate depth of hardened layer could not be attained by only a short time of carbonitriding treatment. In bearing sample Nos. 47 and 48, the Mn content of the raw material for the rolling elements was so low that an appropriate amount of $\gamma_R$ could not be assured. In bearing sample No. 49, the Cr content of the raw material for the rolling elements was low. Hence, these five bearings were all short-lived.

In bearing sample Nos. 51 and 52, rolling elements were combined with inner and outer races made of the same steel species as said rolling elements (SCr 440 in sample No. 51 and SUJ 2 in sample No. 52); hence, not only the rolling elements but also the inner and outer races were unacceptably high in wear rate. In addition, the individual parts of the bearings were not carbonitrided, so that an appropriate amount of $\gamma_R$ could not be insured. For these reasons, the bearing's life of sample Nos. 51 and 52 was short.

As described above, the rolling bearing that attains the second object of the invention and which is particularly suitable for use in applications where high wear resistance is required employs rolling elements that are made from a low-cost material which is rendered highly wear resistant by carbonitriding the material. As a result, not only the rolling elements but also the inner or outer race is improved in wear resistance, thereby providing a bearing that is long-lived under lubrication in the presence of foreign matter. The present invention is also capable of providing improved wear resistance for the larger collar plane of the inner race in a conical roller bearing; this is also the case for those parts of bearings which are simultaneously subjected to rolling and sliding operations, as exemplified by the inner and outer raceways of conical roller bearings, and the raceways or collar planes of cylindrical and spherical roller bearings. Consequently, long-lived bearings can be provided by the present invention.

(B) The bearing that attains the third object of the present invention will now be described with reference to examples.

The alloy compositions used in the examples of the bearing that attains the third object of the present invention are listed in Table 10 below.

TABLE 10

| Steel species | C (wt %) | Si (wt %) | Mn (wt %) | Cr (wt %) | Mo (wt %) | V (wt %) | Ni (wt %) | Remarks |
| --- | --- | --- | --- | --- | --- | --- | --- | --- |
| M1 | 0.4 | 0.3 | 0.8 | 1.5 | — | — | — | Invention |
| M2 | 0.2 | 0.2 | 0.5 | 1.2 | 1.0 | — | — | Invention |
| M3 | 0.8 | 0.2 | 0.5 | 1.5 | — | 1.0 | — | Invention |
| M4 | 0.2 | 0.8 | 0.4 | 0.8 | — | — | 1.5 | Invention |
| M5 | 0.2 | 0.4 | 1.0 | 0.8 | 3.0 | — | — | Invention |
| M6 | 0.4 | 0.3 | 0.8 | 1.0 | — | 2.0 | — | Invention |
| M7 | 0.5 | 0.3 | 1.5 | 0.5 | — | — | — | Invention |
| M8 | 0.3 | 1.5 | 0.4 | 1.2 | 0.8 | — | — | Invention |
| M9 | 0.4 | 0.2 | 0.8 | 3.0 | 0.5 | 0.5 | — | Invention |
| M10 | 0.4 | 0.3 | 0.8 | 0.3 | — | — | — | Comparison |
| M11 | 1.0 | 0.3 | 0.2 | 1.5 | — | — | — | Prior art |
| M12 | 0.2 | 0.3 | 0.8 | 1.1 | — | — | — | Prior art |

Conventional steel species M11 was JIS SUJ 2 and conventional steel species M12 was JIS SCr 420. The samples of the present invention and the comparative sample were subjected to the following heat treatment: carbonitriding at appropriate conditions selected from 850°–900° C×1–8 h was followed by secondary hardening at 820°–880° C. which, in turn, was followed by tempering at 180° C. for 2 h. Conventional SUJ 2 was hardened at 840° C., then tempered at 180° C. for 2 h, and conventional SCr 420 was carburized at 930° C. for 4 h, then subjected to secondary hardening at 860° C., followed by tempering at 180° C. for 2 h. The thus heat treated samples were subjected to various experiments.

Table 11 shows the quality of the respective heat-treated specimens, as well as the results of the life and wear tests conducted on the specimens.

TABLE 11

| Specimen | Steel species | Surface C concentration (wt %) | Surface N concentration (wt %) | $L_{10}$ life ($\times 10^6$ cycles) | Wear ($\times 10^{-5}$ g/m) | Remarks |
| --- | --- | --- | --- | --- | --- | --- |
| T1 | M1 | 0.92 | 0.43 | 17.3 | 0.80 | Invention |
| T2 | M2 | 0.91 | 0.48 | 21.2 | 0.84 | Invention |
| T3 | M3 | 1.21 | 0.32 | 19.3 | 0.82 | Invention |
| T4 | M4 | 0.82 | 0.35 | 18.5 | 0.91 | Invention |
| T5 | M5 | 1.10 | 0.58 | 22.2 | 0.78 | Invention |
| T6 | M6 | 1.35 | 0.31 | 20.4 | 0.75 | Invention |
| T7 | M7 | 0.95 | 0.43 | 18.1 | 0.81 | Invention |
| T8 | M8 | 0.85 | 0.30 | 21.8 | 0.92 | Invention |
| T9 | M9 | 1.48 | 0.68 | 24.1 | 0.76 | Invention |
| T10 | M10 | 0.91 | 0.43 | 8.1 | 0.88 | Comparison |
| T11 | M1 | 0.83 | 0.15 | 7.2 | 4.31 | Comparison |
| T12 | M1 | 1.60 | 0.41 | 5.7 | 0.85 | Comparison |
| T13 | M2 | 0.68 | 0.32 | 8.4 | 1.03 | Comparison |
| T14 | M3 | 1.01 | 0.24 | 11.6 | 3.11 | Comparison |
| T15 | M7 | 0.87 | 0.18 | 10.7 | 4.16 | Comparison |
| T16 | M11 | 1.03 | — | 2.4 | 4.48 | Comparison |
| T17 | M12 | 0.85 | — | 6.3 | 4.28 | Comparison |

The life test was conducted with the already specified thrust type testing machine under lubrication in the presence of added foreign matter. The test conditions were as follows.

| | |
| --- | --- |
| Contact pressure | 4,900 MPa |
| Rotating speed | 1,000 cpm |
| Lubricant | #68 turbine oil |
| Foreign matter added | Steel (SUS 420J2) particles (hardness, $H_RC$ 52; size, 80–160 μm) added in an amount of 300 ppm |

Figure 2:
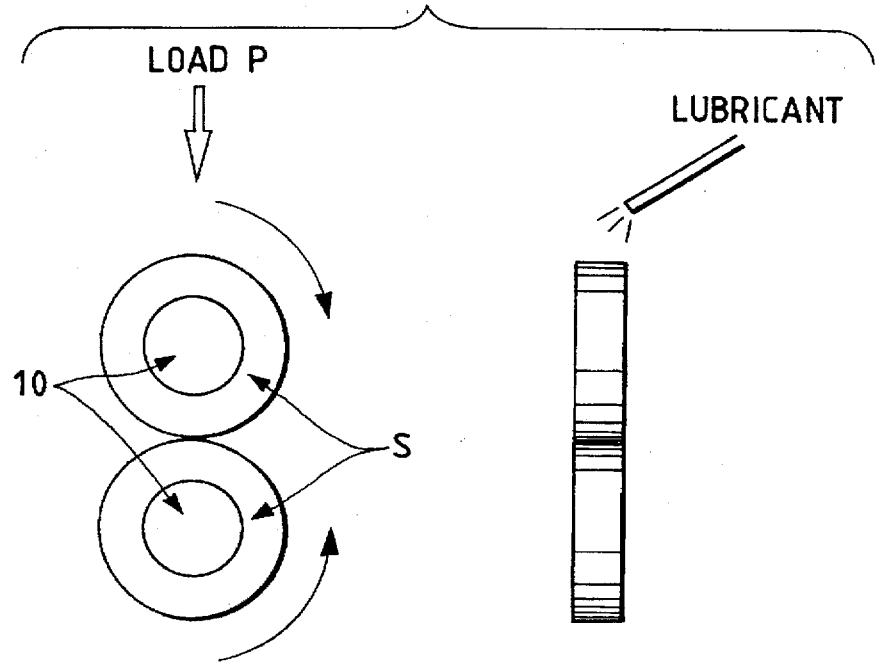
FIG. 2 shows conceptually a two-cylinder wear tester.

The wear test was conducted with a two-cylinder wear tester of the construction shown in FIG. 2. After a specimen S was mounted on their circumference, a pair of vertically opposed cylinders 10 were rotated at low speed in opposite directions with a load P being imposed from above so that the two specimens would contact each other, and the average of the amounts of wear (g/m) of the two specimens S was determined. In order to evaluate the wear characteristic under poor lubrication, a lubricant of such a low viscosity that the oil film would easily break was kept supplied to the rotating cylinders.

The wear test conditions were as follows.

| | |
|---|---|
| Load | 100 kgf |
| Rotational speed | 10 rpm |
| Slip ratio | 30% |
| Lubricant | S10 |
| Oil temperature | 60° C. |

Specimens T1–T9 were samples of the bearing that could attain the third object of the present invention. Obviously, they were remarkably improved over the conventional samples in both the wear and life characteristics. Specimen T10 had Cr added in less than 0.5 wt %, which was insufficient to attain a satisfactory life. Specimens T11, T14 and T15 were all comparisons that had too low nitrogen concentrations in the surface layer, so they were unsatisfactory in both the life and wear characteristics. Specimen T12 was a comparison that had a surface carbon concentration higher than 1.5 wt %; since coarse reticulate carbides precipitated at crystal grain boundaries, the life of this specimen was very short. Specimen T13 was a comparison that had a surface carbon concentration less than 0.8 wt %, so it was unsatisfactory in the life characteristic.

It should be noted that the concept of the bearing that attains the third object of the present invention need not be applied to all components of the bearing but may be applied to only the fixed race which is operated under the heaviest load condition (the outer race is fixed if the rolling bearing is to be used with the inner race rotating, or vice versa). Even if SUJ 2, SCr 420, SCM 420 or other conventional steel species are used in the rotating race and the rolling elements, the bearing can exhibit the wear resistance and the life under lubrication in the presence of foreign matter that are required by rolling bearings and yet it can be manufactured at a lower cost.

(C) The rolling bearing that attains the fourth object of the present invention by satisfying both requirements for high wear resistance and low cost in addition to the good rolling life characteristic under lubrication in the presence of foreign matter in high-speed, light-load applications will now be described with reference to examples.

(1) The relationship between the composition of bearing's alloy steel and each of the lives of a cutting tool and a die:

Steel species within the scope of the present invention and comparative samples were evaluated for the lives of a cutting tool and the die used in cold die forging (upsetting).

A tool life test was conducted under the following conditions.

| | |
|---|---|
| Cutting machine | high-speed lathe |
| Tool | P10 (JIS B4053) |
| Cutting speed | 180–220 m/sec |
| Feed | 0.2–0.3 mm/rev |
| Depth of cut | 0.6–1.0 mm |

Under the conditions indicated above, the samples were cut in accordance with the cutting test method specified in JIS B4011 and the life of the cutting tool was held to have come to an end when the flank wear of the cutting tool reached 0.2 mm.

A die life test was conducted under the following conditions.

| | |
|---|---|
| Die | V30 (JIS B4053) |
| Degree of upsetting | 15–20% |
| Working efficiency | 300–400 pieces per minute |
| Lubrication | Zinc phosphate film + lubricant |

The steel species were worked under test under these conditions and the life of the die was held to have come to an end when cracks or other failures that occurred in the die caused flaws or other deformations to develop in the worked pieces. The life of the die was expressed in terms of the number of pieces that could be worked before those phenomena occurred. The results of the two tests are shown in Table 12.

TABLE 12

| Steel species | C (wt %) | Si (wt %) | Mn (wt %) | Cr (wt %) | Tool life (min) | Die life ($\times 10^3$ pieces) |
|---|---|---|---|---|---|---|
| Invention | | | | | | |
| N1 | 0.34 | 0.45 | 1.46 | 0.15 | 136 | 224 |
| N2 | 0.45 | 0.42 | 0.56 | 0.72 | 137 | 225 |
| N3 | 0.54 | 0.43 | 0.87 | 0.45 | 133 | 223 |
| N4 | 0.70 | 0.43 | 0.80 | 0.60 | 127 | 212 |
| N5 | 0.85 | 0.45 | 0.75 | 0.24 | 126 | 211 |
| Comparison | | | | | | |
| N6 | 0.24 | 0.46 | 1.15 | 0.47 | 142 | 230 |
| N7 | 0.46 | 0.49 | 1.16 | 0.87 | 128 | 218 |
| N8 | 0.56 | 0.42 | 1.57 | 0.43 | 32 | 76 |
| N9 | 0.80 | 0.45 | 0.43 | 0.09 | 129 | 220 |
| N10 | 0.96 | 0.44 | 1.31 | 0.40 | 28 | 72 |
| N11 | 0.44 | 0.43 | 0.64 | 0.92 | 117 | 206 |
| N12 | 0.43 | 0.45 | 1.12 | 0.06 | 139 | 226 |

All of the steel species within the compositional ranges of the alloy steel for use in the rolling bearing of the present invention had satisfactory results in both the tool and die life characteristics. However, comparative samples N8 and N10 which had unduly high Mn and C contents, respectively, were poor in both the tool and die life characteristics; in addition, their production cost was high. Hence, comparative samples N8 and N10 were not subjected to any subsequent experiments on heat treatment.

(2) The quality of heat treated bearing's alloy steels:

The alloy steels listed in Table 12 which were within the scope of the present invention and the comparative samples also listed in the same table (except N8 and N10) were subjected to the following heat treatments F, G and H and evaluated for their quality.

(Heat treatment F)

Carbonitriding was effected at a temperature of 840°–900° C. for 1–4 h in an endothermic gas atmosphere as supplemented with an enriched gas and ammonia gas such that residual ammonia would be contained in an amount of at least 0.1 vol %. Following directly hardening, tempering was effected at 160°–180° C. for 2 h. Alternatively, directly hardening was followed by holding at 830°–860° C. for 30 min and secondary hardening which, in turn, was followed by tempering at 160°–180° C. for 2 h.

(Heat treatment G)

Carbonitriding was effected at a temperature of 870°–930° C. for 1–4 h in an endothermic gas atmosphere as supplemented with an enriched gas and ammonia gas such that residual ammonia would be contained in an amount of less than 0.1 vol %. Following directly hardening, tempering was effected at 160°–180° C. for 2 h. Alternatively, directly hardening was followed by holding at 830°–860° C. for 30 min and secondary hardening which, in turn, was followed by 2-h tempering at 160°–180° C.

(Heat treatment H)

Subjected to normal carburization at a temperature of 930°–960° C. for 5–7 h, then left to cool to room temperature, held at 830°–860° C. for 30 min, then hardened, followed by tempering at 160°–180° C. for 2 h.

The alloy steels within the scope of the present invention were subjected to heat treatment F and the treatment as short as 1–4 h was sufficient to attain an adequate depth of carburization/nitriding. In almost all cases, directly hardening was effected and this made the production cost almost comparable to that of normal hardening. However, since deformation that results from hardening provides a considerable difficulty to thin-walled bearings, secondary hardening or press quenching is performed in order to suppress the deformation, so that the fraction defective and the grinding cost are reduced. As a result, it may have an advantage in production cost. Complete bearings are not given an adequate amount of nitrogen unless an ammonia analyzer is used to control the amount of residual ammonia so that it is at least 0.1 vol % or more. If the carbonitriding temperature exceeds 900° C., the ammonia gas decomposes at such an accelerated rate that it is difficult to insure an adequate amount of residual ammonia and the efficiency of nitrogen diffusion decreases. What is more, the coarsening of crystal grains and other undesirable phenomena lead to lower toughness, thus impairing the performance of the bearing. If the carbonitriding temperature is lower than 840° C., the time of heat treatment required to attain an adequate depth of hardened layer is so much prolonged that the production cost increases; hence, the carbonitriding temperature is specified to range from 840° to 900° C.

Table 13 shows the quality of heat treated steel species, the results of a thrust life test conducted under lubrication in the presence of added foreign matter (using the already specified thrust type tester), as well as the grindability and wear characteristics of those steel species.

Figure 3:
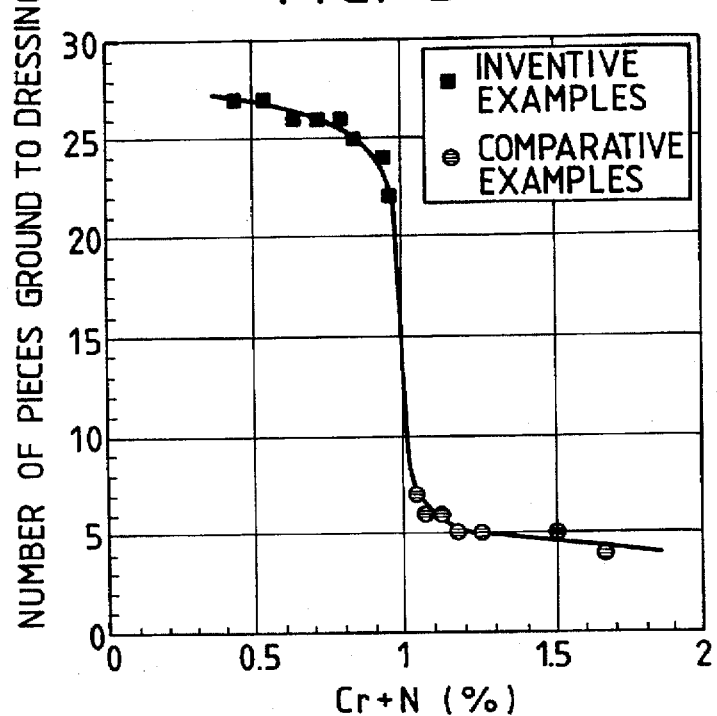
FIG. 3 is a graph showing the relationship between the total content of Cr+N and grindability in examples of the present invention and a comparative example.
Figure 4:
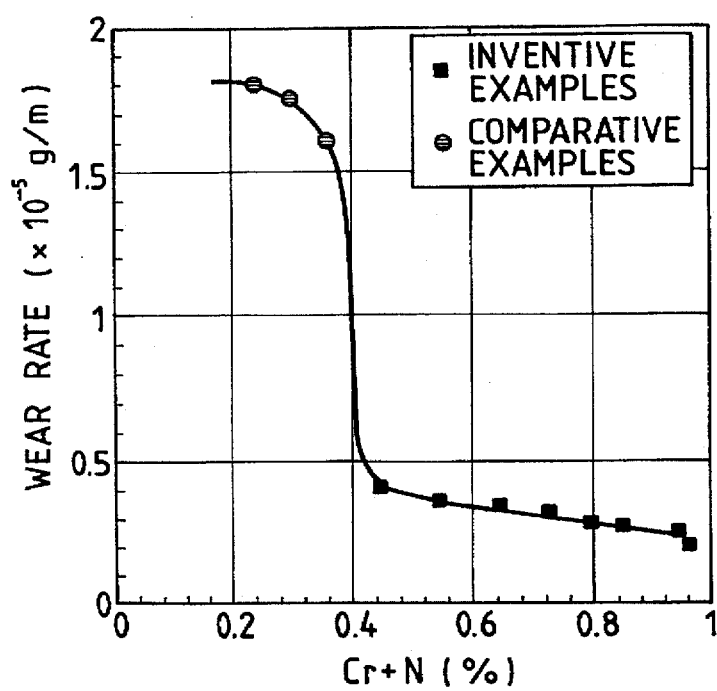
FIG. 4 is a graph showing the relationship between the total content of Cr+N and wear resistance in other examples of the present invention and comparative examples.

FIG. 3 shows the relationship between Cr+N and grindability, and FIG. 4 shows the relationship between Cr+N and wear resistance.

The life test, grinding test and wear test were conducted under the following respective conditions.

| Life test | |
|---|---|
| Contact pressure | 4,900 MPa |
| Rotational speed | 1,000 rpm |
| Lubricant | #68 turbine oil |
| Foreign matter added | $Fe_3C$-base particles (hardness, $H_RC$ 52; size, 74–147 μm) were added to the lubricant in an amount of 300 rpm. |
| Grinding test | |
| Grinding wheel | WA100 |
| Grinding fluid | soluble type |
| Peripheral grinding speed | 2,800–3,000 m/min |

The test specimens were inner races (Designation No. 6206) and their raceway surfaces were ground with the grinding wheel under the conditions indicated above and the number of the inner races that could be ground before the dressing of the grinding wheel became necessary was counted.

| Wear test | |
|---|---|
| Testing machine | Two cylinder wear tester (see FIG. 2) |
| Load | 50 kgf |
| Rotational speed | 100 rpm |
| Slip ratio | 30% |
| Lubricant | S10 |
| Oil temperature | 60° C. |

Using two cylindrical test specimens of the same steel species, the wear test was conducted under the above-indicated conditions, and the weight losses (the amounts of wear) of the two specimens were measured. The average was taken to determine the wear rate of each steel species.

TABLE 13

| | No. | Steel species | Heat treatment | C (wt %) | N (wt %) | Cr (wt %) | Cr + N (wt %) | Grindability (No. of pieces) | Wear ($\times 10^{-5}$ g/m) | $L_{10}$ life ($\times 10^6$ cycles) |
|---|---|---|---|---|---|---|---|---|---|---|
| Invention | 1A | N1 | F | 0.93 | 0.30 | 0.15 | 0.45 | 27 | 0.41 | 27.54 |
| | 2A | N5 | F | 1.13 | 0.31 | 0.24 | 0.55 | 27 | 0.36 | 24.89 |
| | 3A | N5 | F | 1.03 | 0.41 | 0.24 | 0.65 | 26 | 0.32 | 29.45 |
| | 4A | N3 | F | 0.96 | 0.28 | 0.45 | 0.73 | 26 | 0.28 | 25.67 |
| | 5A | N5 | F | 0.98 | 0.56 | 0.24 | 0.80 | 26 | 0.27 | 24.14 |
| | 6A | N4 | F | 1.06 | 0.25 | 0.60 | 0.85 | 25 | 0.25 | 28.29 |
| | 7A | N2 | F | 0.92 | 0.23 | 0.72 | 0.95 | 24 | 0.21 | 25.31 |
| | 8A | N1 | F | 0.63 | 0.82 | 0.15 | 0.97 | 22 | 0.20 | 28.21 |

TABLE 13-continued

|  | No. | Steel species | Heat treatment | C (wt %) | N (wt %) | Cr (wt %) | Cr + N (wt %) | Grindability (No. of pieces) | Wear (×10⁻⁵ g/m) | L₁₀ life (×10⁶ cycles) |
|---|---|---|---|---|---|---|---|---|---|---|
| Comparison | 9A | N7 | F | 0.92 | 0.21 | 0.87 | 1.08 | 6 | 0.20 | 26.35 |
|  | 10A | N3 | F | 0.84 | 0.60 | 0.45 | 1.05 | 7 | 0.20 | 25.88 |
|  | 11A | N4 | F | 0.93 | 0.53 | 0.60 | 1.13 | 6 | 0.19 | 27.23 |
|  | 12A | N2 | F | 0.87 | 0.46 | 0.72 | 1.18 | 5 | 0.20 | 26.90 |
|  | 13A | N2 | F | 0.83 | 0.54 | 0.72 | 1.26 | 5 | 0.19 | 28.74 |
|  | 14A | N2 | F | 0.76 | 0.79 | 0.72 | 1.51 | 5 | 0.18 | 28.17 |
|  | 15A | N7 | F | 0.76 | 0.80 | 0.87 | 1.67 | 4 | 0.17 | 27.55 |
|  | 16A | N9 | F | 1.07 | 0.34 | 0.09 | 0.43 | 27 | 1.64 | 8.78 |
|  | 17A | N6 | F | 0.55 | 0.25 | 0.47 | 0.72 | 26 | 0.42 | 7.21 |
|  | 18A | N7 | H | 1.09 | — | 0.87 | 0.87 | 25 | 1.53 | 9.75 |
|  | 19A | N1 | H | 1.04 | — | 0.15 | 0.15 | 29 | 1.91 | 7.82 |
|  | 20A | N1 | G | 0.93 | 0.09 | 0.15 | 0.24 | 28 | 1.80 | 9.93 |
|  | 21A | N1 | G | 0.85 | 0.15 | 0.15 | 0.30 | 27 | 1.76 | 11.77 |
|  | 22A | N5 | G | 1.21 | 0.12 | 0.24 | 0.36 | 27 | 1.61 | 8.14 |
|  | 23A | N7 | G | 0.98 | 0.10 | 0.87 | 0.97 | 18 | 1.15 | 14.48 |
|  | 24A | N11 | G | 0.99 | 0.09 | 0.92 | 1.01 | 15 | 0.91 | 15.90 |
|  | 25A | N4 | F | 1.23 | 0.29 | 0.60 | 0.89 | 25 | 0.71 | 9.91 |
|  | 26A | N12 | F | 0.61 | 0.92 | 0.06 | 0.98 | 8 | 0.21 | 10.32 |
|  | 27A | N1 | F | 0.95 | 0.22 | 0.15 | 0.37 | 28 | 1.60 | 10.77 |

Run Nos. 1A to 8A in Table 13 were alloy steels within the scope of the present invention and each of them was long-lived and exhibited satisfactory wear and grindability characteristics; hence, they could provide long-lived, wear-resistant bearings at low cost.

Run Nos. 9A to 15A as comparisons had Cr+N contents in excess of 1.0 wt %; their production cost substantially increased since their grindability was very low.

Run No. 16A had Mn and Cr contents which were short of the minimum necessary contents and, hence, it was not improved in either wear or life characteristic.

Run No. 17A had such a low C content in the raw material that the heat treatment conducted for a short period of time was incapable of imparting an adequate amount of carbon and the resulting insufficiency of $\gamma_R$ made this comparative sample short-lived.

Run Nos. 18A and 19A were normally carburized samples and due to the absence of nitrogen, these comparative samples were not improved in either wear or life characteristic.

Run Nos. 20A to 22A were comparisons that had a Cr+N content less than 0.4 wt % and which hence did not have satisfactory wear resistance. In particular, run No. 22A was short-lived since $\gamma_R$ was generated near the surface in a more-than-necessary amount.

Run Nos. 23A and 24A were examples of the case of carbonitriding at low N contents and they were not improved in the balance between grindability and wear resistance because the Cr content was unduly high whereas the amount of solid solution of N was inadequate.

Among the comparative samples, run No. 25A gave fairly good results in terms of grindability and wear resistance; however, due to the excessive carbon content of the surface layer, proeutectoid crystals (carbides) formed more or less, resulting in a shorter rolling life.

Run No. 26A had poor grindability due to the excessive nitrogen content of the surface layer.

Run No. 27A satisfied the requirements of Cr content and the surface nitrogen content; however, Cr+N was less than 0.4 wt % and no improvement was achieved in wear resistance.

(3) Cr+N as related to grindability and wear resistance:

Assuming that N is contained in an amount of 0.2 wt % or more, the grindability deteriorates rapidly if the total content of Cr and N (Cr+N) exceeds 1.0 wt % (see FIG. 3) whereas the wear resistance drops remarkably if Cr+N is less than 0.4 wt % (see FIG. 4). Even if Cr+N is within the range 0.4–1.0 wt %, satisfactory wear resistance is not attainable if N is not contained in an amount of 0.2 wt % or more.

Figure 5:
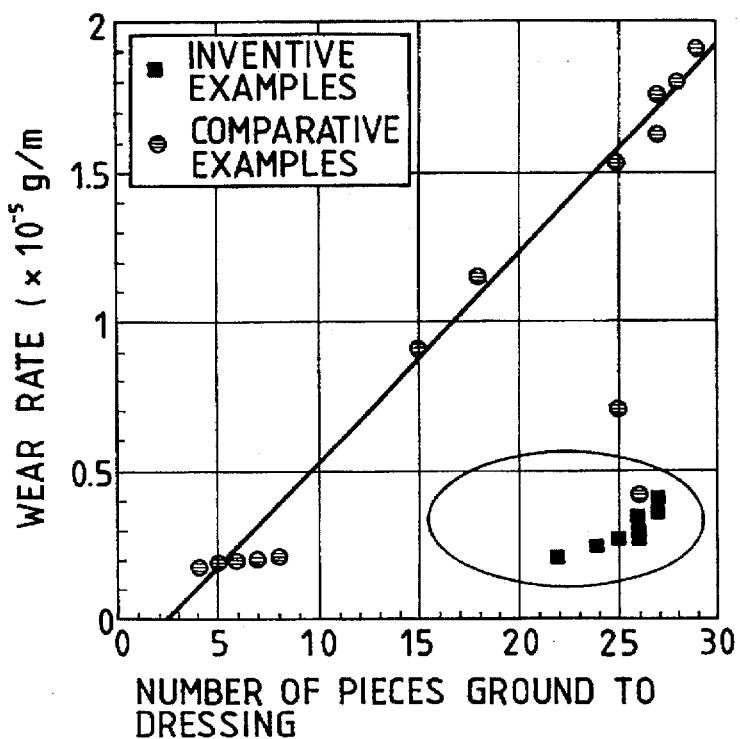
FIG. 5 is a graph showing the relationship between wear resistance and grindability in yet other examples of the invention and comparative examples.

FIG. 5 shows the relationship between wear resistance and grindability. With the comparisons in which at least one of the three parameters of Cr content, N content in the surface layer and their sum Cr+N was outside the scope of the present invention, the improvement in wear resistance was prone to be offset by deterioration in grindability. In contrast, the samples within the scope of the present invention produced satisfactory results in both the grindability and wear characteristics. Comparison Nos. 17A and 25A were fairly close to the samples of the present invention in both wear and grindability characteristics; however, the carbon contents of the surface layer were both outside the range (0.6–1.2 wt %) of the present invention and these comparisons had only a short life as already mentioned in connection with Table 10.

Hence, the rolling bearing that attains the fourth object of the present invention can be produced by incorporating at least 0.2 wt % of N and adjusting Cr+N to fall within the range 0.4–1.0 wt %; the bearing thus obtained has superior grindability and wear resistance and yet can be manufactured at low cost.

All aspects of the present invention that have been described above are applicable to various types of rolling bearings (including, for example, ball bearings, cylindrical roller bearings, conical roller bearings and spherical roller bearings, which may be of a radial or thrust type).

As described on the foregoing pages in detail, the rolling bearing that attain the first object of the present invention has an appropriate amount of retained austenite $\gamma_R$ in the surface layer of an inner race, an outer race or rolling elements and the surface layer also has satisfactory hardness; as a result, the bearing can perform for an extended rolling life even under lubrication in the presence of foreign matter.

The rolling bearing for attaining the second object of the present invention has been accomplished by optimizing the respective conditions for the raw material, processing and heat treatments with respect to two different classes of bearing components (between rolling elements and both of inner and outer races) which are required to exhibit different capabilities. As for the rolling elements, they are adapted to have a composition which, on a weight basis, consists essentially of 0.7–0.9 wt % of C, 0.1–0.7 wt % of Si, 0.5–1.1 wt % of Mn, 0.1–0.6 wt % of Cr, with the balance being Fe and incidental impurities. A wire made from a raw material having this composition is shaped by cold die forging, then carbonitrided and ground to yield a complete product having a carbon and a nitrogen concentration of 0.8–1.4 wt % and 0.05–0.3 wt %, respectively, in the surface layer. As for the inner and outer races, they are adapted to have a composition which, on a weight basis, consists essentially of 0.3–0.6 wt % of C, 0.1–0.7 wt % of Si, 0.6–1.5 wt % of Mn, 0.1–0.6 wt % of Cr, with the balance being Fe and incidental impurities. A raw material having this composition is turned, then carbonitrided and finally ground to yield a complete product having a carbon and a nitrogen concentration of 0.8–1.4 wt % and 0.05–0.3 wt %, respectively, in the surface layer. Being composed of the combination of those rolling elements with the inner and outer races, the rolling bearing has a longer die and tool life which, coupled with the low alloying cost, contributes to a reduction in the overall product cost; in addition, the rolling bearing has higher performance than the conventional version in that it has a longer life under lubrication in the presence of foreign matter.

Further, according to the second object of the present invention, the rolling bearing is formed of the rolling elements containing the same composition as mentioned above, and the inner and outer races which are made of a bearing steel or case-hardening steel containing Cr more than in the rolling elements by 0.2–2.0 wt %. Therefore, the present invention has the advantages which the rolling bearing can be provided with low production cost while insuring to obtain more high wear resistant even from low-cost materials, and to have a long life even under lubrication in the presence of foreign matter.

The rolling bearing for attaining the third object of the present invention is such that at least one member selected from the group consisting of rolling elements, an inner race and an outer race is formed of an alloy steel which, on a weight basis, consists essentially of 0.1–1.0 wt % of C, 0.1–1.5 wt % of Si, 0.1–1.5 wt % of Mn, 0.5–3.0 wt % of Cr, up to 3.0 wt % of Mo, up to 2.0 wt % of V and up to 2.0 wt % of Ni, with the balance being Fe and incidental impurities, the alloy steel being carbonitrided to form a surface layer having a carbon and a nitrogen concentration of 0.8–1.5 wt % and 0.3–0.7 wt %, respectively. The very fine-grained carbides, nitrides and carbonitrides formed in the surface layer have a dispersion strengthening effect which contributes a remarkable improvement in wear resistance; as a result, the rolling bearing is long-lived and has superior wear resistance and yet can be manufactured at low cost. In view of the fact that radial rolling bearings wear most in those areas of the fixed race to which load is imposed, the concept of the bearing that attains the third object of the present invention may be applied only to either the inner or outer race, whichever fixed, with a conventional alloy steel being used in the rotating race and the rolling elements. Even in this case, satisfactory wear characteristics can be attained to enable the production of a highly wear-resistant and long-lived rolling bearing at an even lower cost.

In addition, the rolling bearing for attaining the fourth object of the present invention is such that at least one member selected from the group consisting of rolling elements, an inner race and an outer race is formed of an alloy steel which, on a weight basis, consists essentially of 0.3–0.9 wt % of C, 0.1–0.7 wt % of Si, 0.5–1.5 wt % of Mn and 0.1–0.8 wt % of Cr, with the balance being Fe and incidental impurities, the alloy steel being carbonitrided and thereafter ground to form a surface layer having a carbon and a nitrogen concentration of 0.6–1.2 wt % and 0.2–0.9 wt %, respectively, with the proviso that the total content of Cr and N is 0.4–1.0 wt %. This rolling bearing exhibits particularly good wear characteristics under high-speed, light-load conditions and it is not only long-lived but can also be manufactured at low cost.

Thus, by proper selection of the components of a raw material according to the present invention, various grades of rolling bearings can be provided that insure a prolonged life under lubrication in the presence of foreign matter and which perform in an optimal way according to a specific object of use.

What is claimed is:

1. A rolling bearing comprising components of an inner race, an outer race and a plurality of rolling elements, wherein the rolling elements are formed of a first alloy steel consisting essentially of:

$0.72 \leq C \leq 0.90$ wt %;

$0.1 \leq Si \leq 0.7$ wt %;

$0.5 \leq Mn \leq 1.1$ wt %;

$0.1 \leq Cr \leq 0.6$ wt %; and incidental impurities and the balance of Fe, wherein each of the rolling elements includes, in its surface layer, C and N contents of $0.8 \leq C \leq 1.4$ wt % and $0.05 \leq N \leq 0.3$ wt %, wherein at least one of the inner race and the outer race are formed of a second alloy steel consisting essentially of:

$0.3 \leq C \leq 0.6$ wt %;

$0.1 \leq Si \leq 0.7$ wt %;

$0.6 \leq Mn \leq 1.5$ wt %;

$0.1 \leq Cr \leq 0.6$ wt %; and incidental impurities and the balance of Fe, wherein each of the inner race and the outer race includes, in its surface layer, C and N contents of $0.8 \leq C \leq 1.4$ wt % and $0.05 \leq N \leq 0.3$ wt %.

2. A rolling bearing comprising components of an inner race, an outer race and a plurality of rolling elements, wherein the rolling elements are formed of a first alloy steel consisting essentially of:

$0.72 \leq C \leq 0.9$ wt %;

$0.1 \leq Si \leq 0.7$ wt %;

$0.5 \leq Mn \leq 1.1$ wt %;

$0.1 \leq Cr \leq 0.6$ wt %; and incidental impurities and the balance of Fe, wherein each of the rolling elements includes, in its surface layer, C and N contents of $0.8 \leq C \leq 1.4$ wt % and $0.05 \leq N \leq 0.3$ wt %, wherein at least one of the inner race and the outer race are formed of a second alloy steel consisting essentially of:

$0.1 \leq C \leq 1.1$ wt %;

$0.1 \leq Si \leq 1.5$ wt %;

$0.1 \leq Mn \leq 1.5$ wt %;

Cr being 0.2–2.0 wt % more than a Cr content of the first alloy steel; and incidental impurities and the balance of Fe, wherein each of the inner race and the outer race includes a hardened surface layer.

3. A rolling bearing comprising components of an inner race, an outer race and a plurality of rolling elements, wherein at least one of the components is formed of an alloy steel consisting essentially of:

0.1≦C≦1.0 wt %;

0.1≦Si≦1.5 wt %;

0.1≦Mn≦1.5 wt %

0.5≦Cr≦3.0 wt %;

Mo≦3.0 wt %;

V≦2.0 wt %;

Ni≦2.0 wt % and incidental impurities and the balance of Fe, wherein at least one of the components includes, in the surface layer, C and N contents of 0.8≦C≦1.5 wt % and 0.3≦N≦0.7 wt %.

4. A rolling bearing comprising components of an inner race, an outer race and a plurality of rolling elements, wherein at least one of the components is formed of an alloy steel consisting essentially of:

0.3≦C≦0.9 wt %;

0.1≦Si≦0.7 wt %;

0.5≦Mn≦1.5 wt %;

0.1≦Cr≦0.8 wt %; and incidental impurities and the balance of Fe, wherein at least one of the components includes, in the surface layer, C and N contents of 0.6≦C≦1.2 wt % and 0.3≦N≦0.9 wt %, wherein the alloy steel has a total content of Cr and N of 0.4≦Cr+N≦1.0 wt %.

5. The rolling bearing of claim 1, wherein the first alloy steel consists essentially of:

0.75≦C≦0.90 wt %;

0.1≦Si≦0.7 wt %;

0.5≦Mn≦1.1 wt %;

0.1≦Cr≦0.6 wt %; and incidental impurities and the balance of Fe.

6. The rolling bearing of claim 2, wherein the first alloy steel consists essentially of:

0.75≦C≦0.9 wt %;

0.1≦Si≦0.7 wt %;

0.5≦Mn≦1.1 wt %;

0.1≦Cr≦0.6 wt %; and incidental impurities and the balance of Fe.

* * * * *